United States Patent
Mordarski et al.

(10) Patent No.: US 11,719,897 B2
(45) Date of Patent: Aug. 8, 2023

(54) MATERIAL PROCESSING UTILIZING HIGH-FREQUENCY BEAM SHAPING

(71) Applicant: PANASONIC INTELLECTUAL PROPERTY MANAGEMENT CO., LTD, Osaka (JP)

(72) Inventors: Mark Mordarski, Tewksbury, MA (US); Bryan Lochman, Nashville, TN (US); Francisco Villarreal-Saucedo, Middleton, MA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 741 days.

(21) Appl. No.: 16/831,986

(22) Filed: Mar. 27, 2020

(65) Prior Publication Data

US 2020/0310055 A1  Oct. 1, 2020

Related U.S. Application Data

(60) Provisional application No. 62/825,108, filed on Mar. 28, 2019.

(51) Int. Cl.
| | |
|---|---|
| B23K 26/0622 | (2014.01) |
| G02B 6/42 | (2006.01) |
| B23K 26/06 | (2014.01) |
| B23K 26/073 | (2006.01) |
| B23K 26/064 | (2014.01) |

(52) U.S. Cl.
CPC ........ G02B 6/4296 (2013.01); B23K 26/0604 (2013.01); B23K 26/064 (2015.10); B23K 26/0622 (2015.10); B23K 26/0734 (2013.01)

(58) Field of Classification Search
CPC ............ B23K 26/0734; B23K 26/0604; B23K 26/0622; B23K 26/064; G02B 6/4296

USPC ...................................................... 219/121.73
See application file for complete search history.

(56) References Cited

U.S. PATENT DOCUMENTS

| | | | | |
|---|---|---|---|---|
| 6,072,929 A * | 6/2000 | Kato | ................ | C03B 37/01446 385/127 |
| 6,275,250 B1 * | 8/2001 | Sanders | ............... | B23K 26/032 347/237 |
| 6,614,975 B2 * | 9/2003 | Richardson | ........ | G02B 6/02019 385/127 |
| 8,781,269 B2 * | 7/2014 | Huber | .................. | B23K 26/064 385/18 |
| 8,822,881 B2 * | 9/2014 | Feng | .................... | G11B 5/4853 219/121.64 |

(Continued)

FOREIGN PATENT DOCUMENTS

JP    2006-278525 A    10/2006

OTHER PUBLICATIONS

International Search Report and Written Opinion Corresponding to International Application No. PCT/US2020/025119 dated Jul. 14, 2020, 14 pages.

*Primary Examiner* — Jimmy Chou
(74) *Attorney, Agent, or Firm* — Morgan, Lewis & Bockius LLP

(57) ABSTRACT

In various embodiments, laser emissions are steered into different regions of an optical fiber, and/or into different optical fibers, in a temporal pattern such that an output has different spatial output profiles. The temporal pattern has a frequency sufficient such that a workpiece is processed by an effective output shape combining the different spatial output profiles.

57 Claims, 14 Drawing Sheets

(56) References Cited

U.S. PATENT DOCUMENTS

| | | | |
|---|---|---|---|
| 8,933,374 B2* | 1/2015 | Hayashi | B23K 26/0624 219/121.81 |
| 9,435,964 B2* | 9/2016 | Tayebati | H01S 3/23 |
| 9,823,422 B2* | 11/2017 | Muendel | G02B 6/4216 |
| 10,088,632 B2* | 10/2018 | Zhou | G02B 6/32 |
| 10,281,656 B2* | 5/2019 | Huber | G02B 6/03644 |
| 10,625,373 B2* | 4/2020 | Popp | B23K 26/08 |
| 10,630,047 B2* | 4/2020 | Zhou | G02B 6/4206 |
| 10,682,726 B2* | 6/2020 | Gross | B23K 26/064 |
| 10,768,373 B2* | 9/2020 | Zhou | G02B 6/32 |
| 11,215,761 B2* | 1/2022 | Huber | B23K 26/073 |
| 11,435,538 B2* | 9/2022 | Zhou | G02B 27/0994 |
| 11,480,846 B2* | 10/2022 | Tayebati | B23K 26/0626 |
| 2002/0006256 A1* | 1/2002 | Inagaki | G02B 6/02261 385/123 |
| 2002/0048621 A1* | 4/2002 | Boyd | B65D 85/8046 426/77 |
| 2006/0219673 A1* | 10/2006 | Varnham | B23K 26/0734 219/121.85 |
| 2006/0249491 A1* | 11/2006 | Jurgensen | B23K 26/0676 219/121.76 |
| 2007/0017905 A1* | 1/2007 | Breitschafter | B23K 26/0622 219/121.61 |
| 2009/0084764 A1* | 4/2009 | Park | B23K 26/0643 219/121.63 |
| 2009/0294423 A1* | 12/2009 | Hu | B23K 26/389 219/121.72 |
| 2011/0310921 A1 | 12/2011 | Chann et al. | |
| 2014/0034625 A1* | 2/2014 | Daniel | B23K 26/38 219/121.72 |
| 2015/0049987 A1* | 2/2015 | Grasso | G02B 6/4204 385/33 |
| 2015/0241632 A1* | 8/2015 | Chann | G02B 6/4296 385/27 |
| 2015/0293306 A1* | 10/2015 | Huber | B23K 26/073 385/18 |
| 2015/0331205 A1* | 11/2015 | Tayebati | G02B 6/4214 385/27 |
| 2015/0378184 A1* | 12/2015 | Tayebati | G02B 27/1006 250/492.1 |
| 2016/0116679 A1* | 4/2016 | Muendel | B23K 26/0626 385/11 |
| 2016/0158889 A1* | 6/2016 | Carter | B29C 73/34 219/76.1 |
| 2016/0274539 A1* | 9/2016 | Smithwick | G03H 1/2645 |
| 2017/0031105 A1* | 2/2017 | Huber | G02B 6/35 |
| 2017/0293084 A1* | 10/2017 | Zhou | H01S 5/005 |
| 2018/0159299 A1 | 6/2018 | Zhou et al. | |
| 2018/0210144 A1* | 7/2018 | Villarreal-Saucedo | G02B 6/34 |
| 2019/0265419 A1* | 8/2019 | Tayebati | H01S 3/23 |
| 2020/0310055 A1* | 10/2020 | Mordarski | B23K 26/0734 |

\* cited by examiner

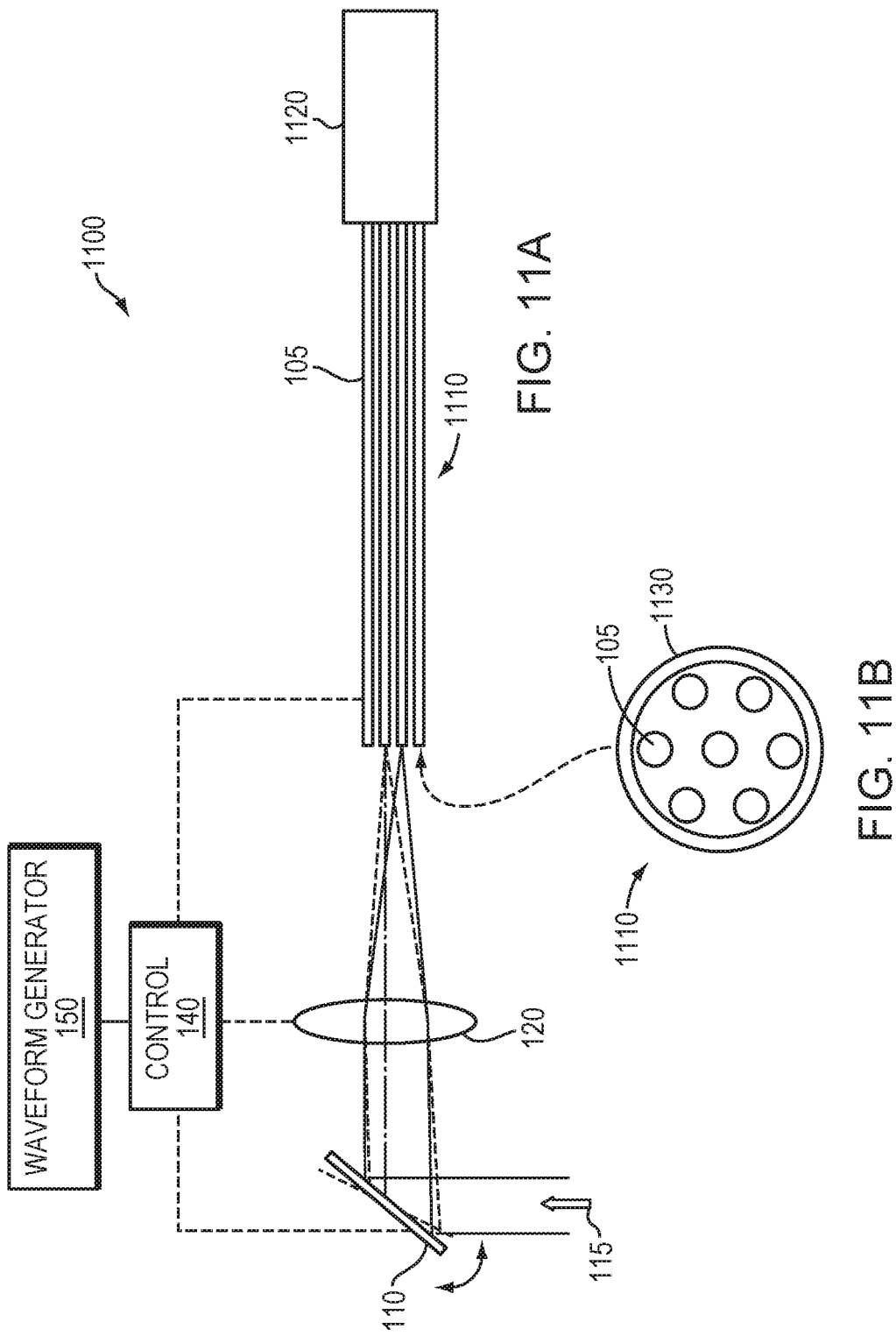

MATERIAL PROCESSING UTILIZING HIGH-FREQUENCY BEAM SHAPING

RELATED APPLICATIONS

This application claims the benefit of and priority to U.S. Provisional Patent Application No. 62/825,108, filed Mar. 28, 2019, the entire disclosure of which is hereby incorporated herein by reference.

TECHNICAL FIELD

In various embodiments, the present invention relates to the processing (e.g., welding or cutting) of materials utilizing high-power laser devices having shapeable beams.

BACKGROUND

High-power lasers are used in many cutting, etching, annealing, welding, drilling, and soldering applications. As in any materials-processing operations, efficiency can be a critical limiting factor in terms of expense and time; the lower the efficiency, the higher will be the cost and/or the slower will be the operation of the laser deployed to process a given material. The properties of the laser beam can influence efficiency, and different materials (such as copper, aluminum, steel, etc.) respond differently to beam properties as they are processed. Moreover, the thicknesses of these materials can affect their response. That is, the nature of a cut or weld may vary with the beam properties depending on the material and/or its thickness.

In addition, even for the same material and thickness thereof, the optical response (and thus optimal beam) of the material may vary depending upon the geometry of the processing. For example, the optical response of a material during a long straight cut may be different compared to an intricate shape with, e.g., sharp corners, curves, or other features.

Furthermore, high-power laser systems often include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). (BPP values disclosed herein are in units of mm-mrad unless otherwise indicated.) A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

Fiber-based laser-processing systems may be configured to select between different beam shapes by, for example, movement of one or more optical elements with respect to (e.g., in, out, or within) the laser beam. However, such systems may be complex and require expensive, specialized optics. Moreover, while conventional systems may be configured to select among multiple beam shapes depending upon, e.g., the material to be processed, the number of possible beam shapes is often limited to a few discrete shapes.

While techniques such as WBC have succeeded in producing laser-based systems for a wide variety of applications, materials-processing challenges remain. For example, lasers having beam shapes optimized for cutting a particular material at a particular thickness may not be suitable for different materials, materials having different thicknesses, materials having variable thicknesses, and even different types and shapes of cuts on that same material. Welding processes present similar challenges. Moreover, conventional systems often enable only the selection among a few different beam shapes, none of which may be completely optimal for the task at hand. Therefore, there is a need for laser systems capable of not only optimizing beam shape for particular materials and processes, but also quickly altering the beam shape during processing, in order to optimize the beam shape "on-the-fly" as the process proceeds.

SUMMARY

In accordance with embodiments of the present invention, laser systems having shapeable output beams are utilized to optimize and simplify materials-processing tasks such as cutting and welding of materials such as metallic materials. In various embodiments, the configuration of the optical fiber utilized to propagate the beam determines, at least in part, the shape of the output beam. For example, the optical fiber may have multiple core regions and/or multiple cladding regions, and in-coupling of the beam into one or more of such regions may determine, at least in part, the shape of the final output beam. In other embodiments, the beam may be steered to different optical fibers, e.g., optical fibers within a shared fiber bundle, where the different fibers (and/or the in-coupling position utilized for one or more of the fibers) determines, at least in part, the shape of the output beam.

In addition, embodiments of the invention feature a switching mechanism configured to steer the laser beam into different regions of the fiber (or into different fibers) at a high rate of speed. The switching speed results in a temporal averaging (or "merging" or "combining") of the different output profiles enabled by the fiber structure(s) (at least as experienced by the workpiece), thereby enabling a host of different effective output beam profiles utilized for processing. When combined with the relative movement between the output beam and the workpiece being processed, the high-speed beam switching enables material processing having different output shapes optimized for such factors as the material composition, processing geometry, processing type, etc. Advantageously, embodiments of the invention thereby enable the use of all, or substantially all, of the output beam power even while optimizing the final beam profile and processing output shape. Thus, embodiments of the invention represent an improvement over conventional methods in which beam-shape selection depends upon the blocking or non-utilization of portions of the output beam power.

In exemplary embodiments of the invention, the high-speed switching mechanism is utilized to steer the laser beam among two or more different fiber regions (and/or two or more different fibers) in accordance with a control waveform. The control waveform may control a switching device, e.g., a flexure-mounted reflector, which steers the beam into different regions of the fiber (and/or into different fibers). The temporal distribution of laser power between or among the different fiber regions may therefore be varied by varying the duty cycle of the control waveform. That is, the effective shape of the output beam, as experienced by the workpiece during processing, is a weighted average of different spatial output profiles (enabled by the different fibers and/or fiber regions) based on the shape and duty cycle of the control waveform. The control waveform may have any of numerous different shapes, e.g., square wave, sinusoidal, sawtooth wave, etc. Various embodiments of the invention may utilize switching devices other than flexure-mounted reflectors, for example, flexure-mounted and/or actuated optical elements such as lenses and/or prisms or electro-optic elements.

In an example embodiment, the control waveform may dictate steering of the beam between (1) a central core region, whereby the output profile of the beam is a Gaussian-like, focused spot beam, and (2) an outer, annular core region, whereby the output profile of the beam is a larger-area annular beam. In various embodiments, such central and annular core regions may be separated by one or more intermediate layers (e.g., one or more core and/or cladding layers). The control waveform dictates a temporal weighted averaging of the two output beam shapes in accordance with the duty cycle of the waveform. For example, at the workpiece, the final output beam may have a shape representing the average of the spot beam and the annular beam for a duty cycle of 50% (i.e., 50% within the inner core and 50% within the outer core), and that shape may be varied toward one of the extremes or the other by variation of the duty cycle.

Laser systems in accordance with various embodiments of the present invention may also include a delivery mechanism that directs the laser output onto the workpiece while causing relative movement between the output and the workpiece. For example, the delivery mechanism may include, consist essentially of, or consist of a laser head for directing and/or focusing the output toward the workpiece. The laser head may itself be movable relative to the workpiece, and/or the delivery mechanism may include a movable gantry or other platform for the workpiece to enable movement of the workpiece relative to the output, which may be fixed in place.

Embodiments of the invention may incorporate optical fibers having many different internal configurations and geometries. For example, the optical fiber may include, consist essentially of, or consist of a central core region and an annular core region separated by an inner cladding layer. One or more outer cladding layers may be disposed around the annular core region. Embodiments of the invention may be utilized with and/or incorporate optical fibers having configurations described in U.S. patent application Ser. No. 15/479,745, filed on Apr. 5, 2017, and U.S. patent application Ser. No. 16/675,655, filed on Nov. 6, 2019, the entire disclosure of each of which is incorporated by reference herein.

In accordance with various embodiments of the present invention, the control waveform may dictate steering of the beam between two or more optical fibers of a fiber bundle for beam shaping, as detailed in U.S. patent application Ser. No. 15/807,795, filed on Nov. 9, 2017, the entire disclosure of which is incorporated by reference herein. One or more of the optical fibers of the fiber bundle may be multi-clad fibers, i.e., incorporate a central core region with multiple cladding regions concentrically surrounding the core region. In other embodiments, one or more of the optical fibers may be single-clad fibers, i.e., have only one cladding region surrounding the core region. In various embodiments, different optical fibers in the fiber bundle have different core diameters. One or more of the fibers in the fiber bundle may have multiple discrete core regions. In accordance with various embodiments, the laser output beam is directed into two different fibers of the fiber bundle and/or into two or more specific cross-sectional regions of the fiber(s) (e.g., the core region and/or one or more of the cladding regions) in order to vary the beam shape in accordance with the control waveform.

In various embodiments, the final combined output beam may also include one or more contributions arising from the "transition areas" of the optical fiber (or fiber bundle) between the two or more fiber regions (or optical fibers in a fiber bundle) to which the beam is deliberately steered by the switching mechanism. That is, the shape of the combined beam may correspond to the weighted average of the integral approximation of the dynamic response curve of the system. Particularly at high frequencies (e.g., 50 Hz or more, 100 Hz or more, etc.), a beam steered between two different fiber regions (or fibers in a fiber bundle) may also illuminate the area of the fiber (or fiber bundle) between those regions for a non-negligible amount of the duty cycle. Thus, embodiments of the invention include embodiments in which the combined shape of the output beam is a weighted average of not only the shapes resulting from the fiber regions or fibers to which the beam is deliberately steered, but also one or more regions traversed by the beam as it transitions between or among those regions or fibers. This contribution to the combined beam shape of the shapes resulting from transition regions may decrease as the speed and response of the switching mechanism increases. In other embodiments, the beam may be switched off during transition to the areas to which it is deliberately steered, minimizing or substantially eliminating the contribution of the transition areas. In addition, the contribution of transition areas to the combined shape resulting from a beam steered to two or more optical fibers in a fiber bundle may be smaller, or even substantially absent, if light emitted between the fibers is not coupled into the bundle for transmission from the output end (i.e., if such light is lost rather than transmitted from the output end of the fiber bundle).

Structurally, optical fibers in accordance with embodiments of the invention may include one or more layers of high and/or low refractive index beyond (i.e., outside of) an exterior cladding without altering the principles of the present invention. Various ones of these additional layers may also be termed claddings or coatings, and may not guide light. Optical fibers may also include one or more cores in addition to those specifically mentioned. Such variants are within the scope of the present invention. Optical fibers, and the various core and cladding layers thereof in accordance with various embodiments of the invention may include, consist essentially of, or consist of glass, such as substantially pure fused silica and/or fused silica doped with fluorine, titanium, germanium, and/or boron. Obtaining a desired refractive index for a particular layer or region of an optical fiber in accordance with embodiments of the invention may be accomplished (by techniques such as doping) by one of skill in the art without undue experimentation. Optical fibers utilized in various embodiments of the invention may feature an optional external polymeric protective coating or sheath disposed around the more fragile glass or fused silica fiber itself. Optical fibers described herein may be multi-mode optical fibers.

Optical fibers detailed herein may have at their output ends a laser head configured to focus the output beam from the fiber toward a workpiece to be processed. The laser head may include, consist essentially of, or consist of one or more optical elements for focusing and/or collimating the output beam, and/or controlling the polarization and/or the trajectory of the beam. The laser head may be positioned to emit the output beam toward a workpiece and/or toward a platform or positionable gantry on which the workpiece may be disposed.

Embodiments of the present invention are typically utilized to process a workpiece such that the surface of the workpiece is physically altered and/or such that a feature is formed on or within the surface, in contrast with optical techniques that merely probe a surface with light (e.g., reflectivity measurements). Exemplary processes in accordance with embodiments of the invention include cutting, welding, drilling, and soldering. Various embodiments of the invention also process workpieces at one or more spots or along a one-dimensional processing path, rather than flooding all or substantially all of the workpiece surface with radiation from the laser beam. For example, one or more beam spots may be translated relative to the surface of the workpiece for processes such as cutting or welding. In general, processing paths may be curvilinear or linear, and "linear" processing paths may feature one or more directional changes, i.e., linear processing paths may be composed of two or more substantially straight segments that are not necessarily parallel to each other.

Changing the "shape" of a laser beam herein refers to altering the spatial profile (i.e., 3D shape) and geometric extent of the beam (e.g., at a point at which the beam intersects a surface). Changes in shape may be accompanied by changes in beam size, angular intensity distribution of the beam, and BPP, but mere changes in beam BPP are not necessarily sufficient to change laser beam shape and vice versa. Laser beam shaping is the process of redistributing the intensity (irradiance) and phase of the beam. The intensity distribution defines the beam profile, such as Gaussian, Bessel, annular, multimode, rectangular, top-hat, elliptical or circular, and different intensity profiles may be desirable for specific laser materials processing techniques. (As utilized herein, an "annular" beam is ring-shaped, i.e., having less or substantially no beam intensity in a center portion that is surrounded by a region of higher beam intensity, but not necessarily circular; that is, "annular" beams may be oval-shaped or otherwise quasi-annular.)

Herein, "optical elements" may refer to any of lenses, mirrors, prisms, gratings, and the like, which redirect, reflect, bend, or in any other manner optically manipulate electromagnetic radiation, unless otherwise indicated. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The input beams received in the embodiments herein may be single-wavelength or multi-wavelength beams combined using various techniques known in the art. The output beams produced in embodiments of the invention may be single-wavelength or multi-wavelength beams. In addition, references to "lasers," "laser emitters," or "beam emitters" herein include not only single-diode lasers, but also diode bars, laser arrays, diode bar arrays, and single or arrays of vertical cavity surface-emitting lasers (VCSELs).

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as input beams in conjunction with embodiments of the present invention for, e.g., control of beam shape and processing of different workpieces.

In an aspect, embodiments of the invention feature a method of processing a workpiece. A laser and an optical fiber having multiple interior regions are provided. In-coupling of a laser emission into each of the interior regions causes the fiber to produce an output having a different spatial output profile. The laser emission is steered, in a temporal pattern, to different ones of the interior regions of the fiber such that the output has different spatial output profiles. Relative movement between the workpiece and the output is caused while directing the output onto the workpiece to process the workpiece. The temporal pattern has a frequency sufficient such that the workpiece is processed, during the relative movement between the workpiece and the output, by an effective output shape combining the different spatial output profiles.

Embodiments of the invention may include one or more of the following in any of a variety of combinations. The workpiece (e.g., at least the surface thereof) may undergo a time-based response to the output based on the spatial output profile and/or a power density thereof. The relative movement may occur no faster than a maximum processing speed. The maximum processing speed (i) may be selected based on the time-based response of the material and the frequency of the temporal pattern and (ii) may ensure that the response is to the effective output shape. Each interior region of the fiber may be a core region. The interior regions may include at least a central first core and an annular second core surrounding the first core. At least one of the interior regions of the fiber may be a core region. At least one of the interior regions of the fiber may be a cladding region. The laser emission may be steered in response to a control waveform. The control waveform may include, consist essentially of, or consist of a square wave. The effective output shape may be a weighted average of the different spatial output profiles based on a shape and duty cycle of the control waveform.

The laser emission may be a multi-wavelength beam. The laser emission may be steered to different ones of the interior regions of the fiber based on (i) a type of processing performed on the workpiece, (ii) a property of the workpiece, and/or (iii) a processing path along which the workpiece is processed. The type of processing may be selected from the list consisting of cutting, welding, etching, annealing, drilling, soldering, and brazing. The property of the workpiece may include, consist essentially of, or consist of a thickness of the workpiece, a composition of the workpiece, a reflectivity of the workpiece, and/or a topography of the workpiece. The laser emission may be steered to different ones of the interior regions of the fiber based on one or more directional changes in the processing path. The laser may include, consist essentially of, or consist of (i) one or more beam emitters emitting a plurality of discrete beams, (ii) focusing optics for focusing the plurality of beams toward a dispersive element, (iii) the dispersive element for receiving and dispersing the received focused beams, and (iv) a partially reflective output coupler positioned to receive the dispersed beams, transmit a portion of the dispersed beams therethrough as the laser emission, and reflect a second portion of the dispersed beams back toward the dispersive element. The laser emission may be composed of multiple wavelengths. The dispersive element may include, consist essentially of, or consist of a diffraction grating.

The optical fiber may include, consist essentially of, or consist of a fiber core, a first cladding region surrounding the fiber core, and a second cladding region surrounding the first cladding region. The optical fiber may include, consist essentially of, or consist of a fiber core, a first cladding region surrounding the fiber core, an annular core surrounding the first cladding region, and a second cladding region surrounding the annular core. The optical fiber may include, consist essentially of, or consist of (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index. The first refractive index may be larger than the fourth refractive index. The third refractive index may be larger than the fourth refractive index. The second refractive index may be smaller than the first refractive index and/or larger than the fourth refractive index. The third refractive index may be larger than the first refractive index.

The optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region, a refractive index of the second region varying between (i) a fifth refractive index less than or equal to the fourth refractive index and (ii) a sixth refractive index greater than or equal to the second refractive index. The first region may be disposed between the second region and the second cladding. The second region may be disposed between the first region and the second cladding.

The optical fiber may include, consist essentially of, or consist of (i) a center core having a first refractive index, (ii) an annular core surrounding the center core, and (iii) surrounding the annular core, a first cladding having a second refractive index smaller than the first refractive index. The annular core may include, consist essentially of, or consist of (a) a first region having a third refractive index greater than the second refractive index, and (b) a second region, a refractive index of the second region varying between (i) a fourth refractive index less than or equal to the third refractive index and (ii) a fifth refractive index less than the fourth refractive index. The first region may be disposed between the second region and the first cladding. The second region may be disposed between the first region and the first cladding.

The optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region having a fifth refractive index greater than the second refractive index and smaller than the fourth refractive index. The first region may be disposed between the second region and the second cladding. The second region may be disposed between the first region and the second cladding.

The optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, (ii) a second region having a fifth refractive index greater than the second refractive index, and (iii) a third region, disposed between the first and second regions, having a sixth refractive index smaller than the fourth and fifth refractive indices. The annular core may include, consist essentially of, or consist of (i) a fourth region having a seventh refractive index greater than the second refractive index, and (ii) a fifth region, disposed between the second and fourth regions, having an eighth refractive index smaller than the fifth and seventh refractive indices.

In another aspect, embodiments of the invention feature a method of processing a workpiece. A laser and a fiber bundle having multiple optical fibers are provided. In-coupling of a laser emission into each of at least two (or even each) of the optical fibers causes the fiber to produce an output having a different spatial output profile. The laser emission is steered, in a temporal pattern, to different ones of the optical fibers of the fiber bundle such that the output has different spatial output profiles. Relative movement between the workpiece and the output is caused while directing the output onto the workpiece to process the workpiece. The temporal pattern has a frequency sufficient such that the workpiece is processed, during the relative movement between the workpiece and the output, by an effective output shape combining the different spatial output profiles.

Embodiments of the invention may include one or more of the following in any of a variety of combinations. The workpiece (e.g., at least the surface thereof) may undergo a time-based response to the output based on the spatial output profile and/or a power density thereof. The relative movement may occur no faster than a maximum processing speed. The maximum processing speed (i) may be selected based on the time-based response of the material and the frequency of the temporal pattern and (ii) may ensure that the response is to the effective output shape. The laser emission may be steered in response to a control waveform. The control waveform may include, consist essentially of, or consist of a square wave. The effective output shape may be a weighted average of the different spatial output profiles based on a shape and duty cycle of the control waveform.

The laser emission may be a multi-wavelength beam. The laser emission may be steered to different ones of the optical fibers based on (i) a type of processing performed on the workpiece, (ii) a property of the workpiece, and/or (iii) a processing path along which the workpiece is processed.

The type of processing may be selected from the list consisting of cutting, welding, etching, annealing, drilling, soldering, and brazing. The property of the workpiece may include, consist essentially of, or consist of a thickness of the workpiece, a composition of the workpiece, a reflectivity of the workpiece, and/or a topography of the workpiece. The laser emission may be steered to different ones of the optical fibers based on one or more directional changes in the processing path. The laser may include, consist essentially of, or consist of (i) one or more beam emitters emitting a plurality of discrete beams, (ii) focusing optics for focusing the plurality of beams toward a dispersive element, (iii) the dispersive element for receiving and dispersing the received focused beams, and (iv) a partially reflective output coupler positioned to receive the dispersed beams, transmit a portion of the dispersed beams therethrough as the laser emission, and reflect a second portion of the dispersed beams back toward the dispersive element. The laser emission may be composed of multiple wavelengths. The dispersive element may include, consist essentially of, or consist of a diffraction grating.

At least one of the optical fibers may include, consist essentially of, or consist of a fiber core, a first cladding region surrounding the fiber core, and a second cladding region surrounding the first cladding region. At least one of the optical fibers may include, consist essentially of, or consist of a fiber core, a first cladding region surrounding the fiber core, an annular core surrounding the first cladding region, and a second cladding region surrounding the annular core. At least one of the optical fibers may include, consist essentially of, or consist of (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index. The first refractive index may be larger than the fourth refractive index. The third refractive index may be larger than the fourth refractive index. The second refractive index may be smaller than the first refractive index and/or larger than the fourth refractive index. The third refractive index may be larger than the first refractive index.

At least one of the optical fibers may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region, a refractive index of the second region varying between (i) a fifth refractive index less than or equal to the fourth refractive index and (ii) a sixth refractive index greater than or equal to the second refractive index. The first region may be disposed between the second region and the second cladding. The second region may be disposed between the first region and the second cladding.

At least one of the optical fibers may include, consist essentially of, or consist of (i) a center core having a first refractive index, (ii) an annular core surrounding the center core, and (iii) surrounding the annular core, a first cladding having a second refractive index smaller than the first refractive index. The annular core may include, consist essentially of, or consist of (a) a first region having a third refractive index greater than the second refractive index, and (b) a second region, a refractive index of the second region varying between (i) a fourth refractive index less than or equal to the third refractive index and (ii) a fifth refractive index less than the fourth refractive index. The first region may be disposed between the second region and the first cladding. The second region may be disposed between the first region and the first cladding.

At least one of the optical fibers may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region having a fifth refractive index greater than the second refractive index and smaller than the fourth refractive index. The first region may be disposed between the second region and the second cladding. The second region may be disposed between the first region and the second cladding.

At least one of the optical fibers may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, (ii) a second region having a fifth refractive index greater than the second refractive index, and (iii) a third region, disposed between the first and second regions, having a sixth refractive index smaller than the fourth and fifth refractive indices. The annular core may include, consist essentially of, or consist of (i) a fourth region having a seventh refractive index greater than the second refractive index, and (ii) a fifth region, disposed between the second and fourth regions, having an eighth refractive index smaller than the fifth and seventh refractive indices.

In yet another aspect, embodiments of the invention feature a laser system that includes, consists essentially of, or consists of a beam source for emission of an input laser beam, an optical fiber having multiple interior regions, a switching mechanism, and a delivery mechanism. In-coupling of an input laser emission into each of the interior regions causes the fiber to produce an output having a different spatial output profile. The switching mechanism steers the input laser emission to different ones of the interior regions of the fiber to produce different spatial output profiles in a temporal pattern having a frequency. The delivery mechanism directs the output onto the workpiece while causing relative movement therebetween, thereby processing the workpiece. The frequency is sufficient such that the workpiece is processed, during the relative movement between the workpiece and the output, by an effective output shape combining the different spatial output profiles.

Embodiments of the invention may include one or more of the following in any of a variety of combinations. The switching mechanism may include, consist essentially of, or consist of a flexure-mounted reflector. The workpiece (e.g., at least the surface thereof) may undergo a time-based response to the output based on the spatial output profile and/or a power density thereof. The switching mechanism may be configured to limit the relative movement to a maximum processing speed. The maximum processing speed (i) may be selected based on the time-based response of the material and the frequency of the temporal pattern and (ii) may ensure that the response is to the effective output shape. Each interior region of the fiber may be a core region. The interior regions may include at least a central first core and an annular second core surrounding the first core. At least one of the interior regions of the fiber may be a core region. At least one of the interior regions of the fiber may be a cladding region. The system may include a waveform generator for generating a control waveform. The switching mechanism may be configured to steer the input laser emission in response to the control waveform. The control waveform may include, consist essentially of, or consist of a square wave. The effective output shape may be a weighted average of the different spatial output profiles based on a shape and duty cycle of the control waveform.

The laser emission may be a multi-wavelength beam. The switching mechanism may be configured to steer the laser emission to different ones of the interior regions of the fiber based on (i) a type of processing performed on the workpiece, (ii) a property of the workpiece, and/or (iii) a processing path along which the workpiece is processed. The type of processing may be selected from the list consisting of cutting, welding, etching, annealing, drilling, soldering, and brazing. The property of the workpiece may include, consist essentially of, or consist of a thickness of the workpiece, a composition of the workpiece, a reflectivity of the workpiece, and/or a topography of the workpiece. The switching mechanism may be configured to steer the laser emission to different ones of the interior regions of the fiber based on one or more directional changes in the processing path. The beam source may include, consist essentially of, or consist of (i) one or more beam emitters emitting a plurality of discrete beams, (ii) focusing optics for focusing the plurality of beams toward a dispersive element, (iii) the dispersive element for receiving and dispersing the received focused beams, and (iv) a partially reflective output coupler positioned to receive the dispersed beams, transmit a portion of the dispersed beams therethrough as the input laser emission, and reflect a second portion of the dispersed beams back toward the dispersive element. The input laser emission may be composed of multiple wavelengths. The dispersive element may include, consist essentially of, or consist of a diffraction grating.

The optical fiber may include, consist essentially of, or consist of a fiber core, a first cladding region surrounding the fiber core, and a second cladding region surrounding the first cladding region. The optical fiber may include, consist essentially of, or consist of a fiber core, a first cladding region surrounding the fiber core, an annular core surrounding the first cladding region, and a second cladding region surrounding the annular core. The optical fiber may include, consist essentially of, or consist of (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index. The first refractive index may be larger than the fourth refractive index. The third refractive index may be larger than the fourth refractive index. The second refractive index may be smaller than the first refractive index and/or larger than the fourth refractive index. The third refractive index may be larger than the first refractive index.

The optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region, a refractive index of the second region varying between (i) a fifth refractive index less than or equal to the fourth refractive index and (ii) a sixth refractive index greater than or equal to the second refractive index. The first region may be disposed between the second region and the second cladding. The second region may be disposed between the first region and the second cladding.

The optical fiber may include, consist essentially of, or consist of (i) a center core having a first refractive index, (ii) an annular core surrounding the center core, and (iii) surrounding the annular core, a first cladding having a second refractive index smaller than the first refractive index. The annular core may include, consist essentially of, or consist of (a) a first region having a third refractive index greater than the second refractive index, and (b) a second region, a refractive index of the second region varying between (i) a fourth refractive index less than or equal to the third refractive index and (ii) a fifth refractive index less than the fourth refractive index. The first region may be disposed between the second region and the first cladding. The second region may be disposed between the first region and the first cladding.

The optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region having a fifth refractive index greater than the second refractive index and smaller than the fourth refractive index. The first region may be disposed between the second region and the second cladding. The second region may be disposed between the first region and the second cladding.

The optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, (ii) a second region having a fifth refractive index greater than the second refractive index, and (iii) a third region, disposed between the first and second regions, having a sixth refractive index smaller than the fourth and fifth refractive indices. The annular core may include, consist essentially of, or consist of (i) a fourth region having a seventh refractive index greater than the second refractive index, and (ii) a fifth region, disposed between the second and fourth regions, having an eighth refractive index smaller than the fifth and seventh refractive indices.

In another aspect, embodiments of the invention feature a laser system that includes, consists essentially of, or consist of a beam source for emission of an input laser beam, a fiber bundle having multiple optical fibers, a switching mechanism, and a delivery mechanism. In-coupling of an input laser emission into each of at least two (or even all) of the optical fibers causes the fiber bundle to produce an output having a different spatial output profile. The switching mechanism steers the input laser emission to different ones of the optical fibers of the fiber bundle to produce different spatial output profiles in a temporal pattern having a frequency. The delivery mechanism directs the output onto the workpiece while causing relative movement therebetween, thereby processing the workpiece. The frequency is sufficient such that the workpiece is processed, during the relative movement between the workpiece and the output, by an effective output shape combining the different spatial output profiles.

Embodiments of the invention may include one or more of the following in any of a variety of combinations. The switching mechanism may include, consist essentially of, or consist of a flexure-mounted reflector. The workpiece (e.g., at least the surface thereof) may undergo a time-based response to the output based on the spatial output profile and/or a power density thereof. The switching mechanism may be configured to limit the relative movement to a maximum processing speed. The maximum processing speed (i) may be selected based on the time-based response of the material and the frequency of the temporal pattern and (ii) may ensure that the response is to the effective output shape. The system may include a waveform generator for generating a control waveform. The switching mechanism may be configured to steer the input laser emission in response to the control waveform. The control waveform may include, consist essentially of, or consist of a square wave. The effective output shape may be a weighted average of the different spatial output profiles based on a shape and duty cycle of the control waveform.

The laser emission may be a multi-wavelength beam. The switching mechanism may be configured to steer the laser emission to different ones of the optical fibers based on (i) a type of processing performed on the workpiece, (ii) a property of the workpiece, and/or (iii) a processing path along which the workpiece is processed. The type of processing may be selected from the list consisting of cutting, welding, etching, annealing, drilling, soldering, and brazing. The property of the workpiece may include, consist essentially of, or consist of a thickness of the workpiece, a composition of the workpiece, a reflectivity of the workpiece, and/or a topography of the workpiece. The switching mechanism may be configured to steer the laser emission to different ones of the optical fibers based on one or more directional changes in the processing path. The beam source may include, consist essentially of, or consist of (i) one or more beam emitters emitting a plurality of discrete beams, (ii) focusing optics for focusing the plurality of beams toward a dispersive element, (iii) the dispersive element for receiving and dispersing the received focused beams, and (iv) a partially reflective output coupler positioned to receive the dispersed beams, transmit a portion of the dispersed beams therethrough as the input laser emission, and reflect a second portion of the dispersed beams back toward the dispersive element. The input laser emission may be composed of multiple wavelengths. The dispersive element may include, consist essentially of, or consist of a diffraction grating.

At least one optical fiber may include, consist essentially of, or consist of a fiber core, a first cladding region surrounding the fiber core, and a second cladding region surrounding the first cladding region. At least one optical fiber may include, consist essentially of, or consist of a fiber core, a first cladding region surrounding the fiber core, an annular core surrounding the first cladding region, and a second cladding region surrounding the annular core. At least one optical fiber may include, consist essentially of, or consist of (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index. The first refractive index may be larger than the fourth refractive index. The third refractive index may be larger than the fourth refractive index. The second refractive index may be smaller than the first refractive index and/or larger than the fourth refractive index. The third refractive index may be larger than the first refractive index.

At least one optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region, a refractive index of the second region varying between (i) a fifth refractive index less than or equal to the fourth refractive index and (ii) a sixth refractive index greater than or equal to the second refractive index. The first region may be disposed between the second region and the second cladding. The second region may be disposed between the first region and the second cladding.

At least one optical fiber may include, consist essentially of, or consist of (i) a center core having a first refractive index, (ii) an annular core surrounding the center core, and (iii) surrounding the annular core, a first cladding having a second refractive index smaller than the first refractive index. The annular core may include, consist essentially of, or consist of (a) a first region having a third refractive index greater than the second refractive index, and (b) a second region, a refractive index of the second region varying between (i) a fourth refractive index less than or equal to the third refractive index and (ii) a fifth refractive index less than the fourth refractive index. The first region may be disposed between the second region and the first cladding. The second region may be disposed between the first region and the first cladding.

At least one optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, and (ii) a second region having a fifth refractive index greater than the second refractive index and smaller than the fourth refractive index. The first region may be disposed between the second region and the second cladding. The second region may be disposed between the first region and the second cladding.

At least one optical fiber may include, consist essentially of, or consist of (i) a center core having a first refractive index, (ii) surrounding the center core, a first cladding having a second refractive index smaller than the first refractive index, (iii) an annular core surrounding the first cladding, and (iv) surrounding the annular core, a second cladding having a third refractive index smaller than the first refractive index. The annular core may include, consist essentially of, or consist of (i) a first region having a fourth refractive index greater than the second refractive index, (ii) a second region having a fifth refractive index greater than the second refractive index, and (iii) a third region, disposed between the first and second regions, having a sixth refractive index smaller than the fourth and fifth refractive indices. The annular core may include, consist essentially of, or consist of (i) a fourth region having a seventh refractive index greater than the second refractive index, and (ii) a fifth region, disposed between the second and fourth regions, having an eighth refractive index smaller than the fifth and seventh refractive indices.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means ±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other. Distances utilized herein may be considered to be "optical distances" unless otherwise specified.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 11A is a schematic diagram of portions of a laser system utilizing an optical fiber bundle in accordance with embodiments of the invention;

FIG. 11B is a schematic end-on view of an exemplary fiber bundle usable in the laser system of FIG. 11A;

DETAILED DESCRIPTION

Figure 1:
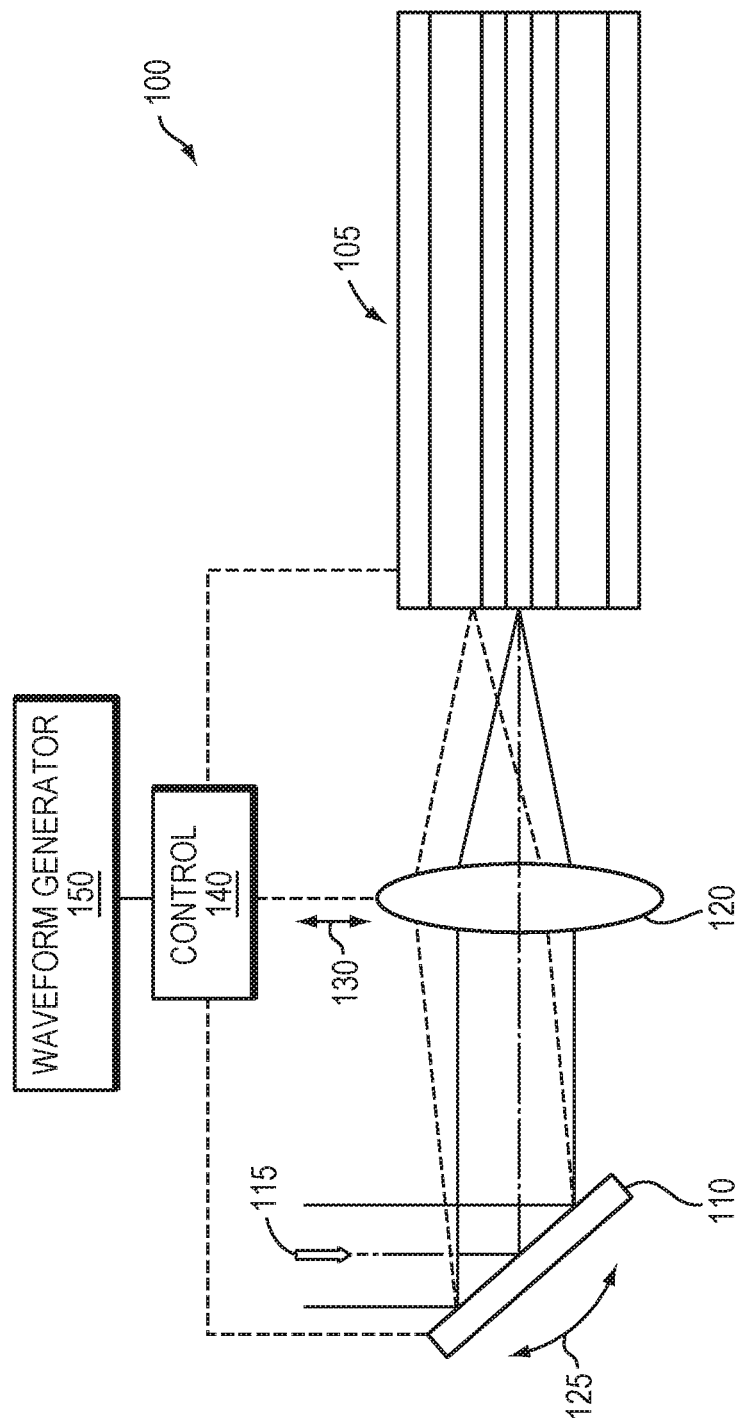
FIG. 1 is a schematic diagram of a laser system in accordance with various embodiments of the invention.

An exemplary laser system 100 for varying laser beam shape using a fiber 105 in accordance with embodiments of the invention is depicted in FIG. 1. As shown, the laser system 100 includes a switching mechanism 110 (e.g., an adjustable reflector such as a tip-tilt adjustable and/or folding mirror) to redirect an incoming input laser beam 115 to a fiber coupling optical element 120 (e.g., one or more lenses, reflective wedges, and/or prisms), which focuses the beam 115 toward the fiber 105. The adjustment or tilt of the switching mechanism 110 is indicated by curved arrow 125. Other switching mechanisms, such as actuated prisms and/or lenses, may be utilized in embodiments of the invention. As shown, the region of the input face of the fiber 105 at which the beam 115 is in-coupled may be at least partially defined by the configuration (e.g., the position and/or angle) of the switching mechanism 110, and/or the adjustment of the location of the optical element 120 (which may be translated within the path of the beam 115 as indicated by arrow 130). Instead or in addition, the fiber 105 may itself be translated in a direction substantially parallel and/or substantially perpendicular to the longitudinal axis of the fiber 105. For the best starting beam quality (i.e., the smallest BPP), the end surface of the fiber 105 may be located at the focal spot of the optical element 130.

Optical fiber 105 may have many different internal configurations and geometries. For example, optical fiber 105 may include, consist essentially of, or consist of a central core region and an annular core region separated by an inner cladding layer. One or more outer cladding layers may be disposed around the annular core region. Embodiments of the invention may be utilized with and/or incorporate optical fibers having configurations described in U.S. patent application Ser. No. 15/479,745, filed on Apr. 5, 2017, and U.S. patent application Ser. No. 16/675,655, filed on Nov. 6, 2019, the entire disclosure of each of which is incorporated by reference herein.

All or a portion of the laser system 100 may be disposed optically upstream of the laser-processing head that is utilized to deliver the output beam to the workpiece. The delivery head may include one or more optical elements for focusing or otherwise directing the output beam to the workpiece. Optical fiber 105 may be optically coupled to the processing head and deliver the output beam thereto.

The configuration of the switching mechanism 110 and/or the optical element 120 and/or the fiber 105 may be controlled via a controller 140 and/or one or more actuators (not shown) operatively connected thereto. Thus, the switching mechanism 110 and/or the optical element 120 and/or the fiber 105 and/or the one or more actuators may be responsive to the controller 140. The controller 140 may be responsive to a desired target spatial output beam profile (e.g., input by a user and/or based on one or more properties of a workpiece to be processed such as the distance to the workpiece, the composition of the workpiece, thickness of the workpiece, reflectivity of the workpiece, topography of the workpiece, etc., and/or based on the type of processing and/or the desired processing path on the workpiece) and configured to position switching mechanism 110 and/or the optical element 120 and/or the fiber 105 to cause the beam 115 to strike the input face of the fiber 105 such that the output beam output from the fiber 105 has the target spatial output beam profile. The output beam thus produced may be directed to a workpiece for processes such as annealing, cutting, welding, drilling, etc. The controller 140 may be programmed to achieve the desired power distribution and/or output BPP and/or beam quality via, e.g., a particular switching mechanism tilt and/or position (and/or tilt) of optical element 120 and/or fiber 105 as detailed herein.

The controller 140 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described herein. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C#, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

The controller 140 may also be operatively connected to, or may incorporate, a waveform generator 150 (e.g., a variable frequency controller or variable frequency generator) configured to generate a control waveform utilized to control the configuration (e.g., tilt and/or translation) of the switching mechanism 110 and/or the optical element 120, and thus the spatial output profile emitted from the fiber 105. Waveform generators are conventional and may be supplied by one of ordinary skill in the art without undue experimentation. The control waveform may be utilized to control the switching mechanism 110 and/or the optical element 120 via, e.g., application of the waveform to the actuator(s) and/or stage(s) controlling the configuration of the switching mechanism 110 and/or the optical element 120. For example, such components may incorporate piezoelectric materials that deform in response to applied electric fields. Such materials, actuators, and stages are conventional and may be provided by one of ordinary skill in the art without undue experimentation.

The controller 140 may also operate a conventional positioning system configured to cause relative movement between the output laser beam and the workpiece being processed. For example, the positioning system may be any controllable optical, mechanical or opto-mechanical system for directing the beam through a processing path along a two- or three-dimensional workpiece. During processing, the controller 140 may operate the positioning system and the laser system 100 so that the laser beam traverses a processing path along the workpiece. The processing path may be provided by a user and stored in an onboard or remote memory, which may also store parameters relating to the type of processing (cutting, welding, etc.) and the beam parameters (e.g., beam shapes) necessary to carry out that processing. In this regard, a local or remote database may maintain a library of materials and thicknesses that the system will process, and upon user selection of material parameters (type of material, thickness, etc.), the controller 140 queries the database to obtain the corresponding parameter values. The stored values may include beam shapes suitable to the material, the type of processing, and/or the geometry of the processing path.

As is well understood in the plotting and scanning art, the requisite relative motion between the beam and the workpiece may be produced by optical deflection of the beam using a movable mirror, physical movement of the laser using a gantry, lead-screw or other arrangement, and/or a mechanical arrangement for moving the workpiece rather than (or in addition to) the beam. The controller 140 may, in some embodiments, receive feedback regarding the position and/or processing efficacy of the beam relative to the workpiece from a feedback unit, which will be connected to suitable monitoring sensors.

The duty cycle of the control waveform may be selected to produce an output shape of the laser beam, at least as experienced by the workpiece, that is a weighted average of two or more spatial output profiles resulting from in-coupling of beam 115 into one or more regions of fiber 105. That is, the duty cycle of the control waveform may determine the temporal pattern in accordance with which the beam 115 is steered into the various regions of the fiber 105, and, thus, the overall averaged output shape of the beam delivered to and experienced by the workpiece. Because, in various embodiments, the switching frequency of the control waveform is greater than the time-response of the workpiece to the beam, the effect of the laser beam on the workpiece corresponds to the weighted average of the various spatial output profiles of the beam, even if those output profiles are discrete from each other at the beam output. Thus, herein "merged" or "averaged" or "combined" output beam shape refers to the average beam profile experienced at the workpiece.

Figure 2:
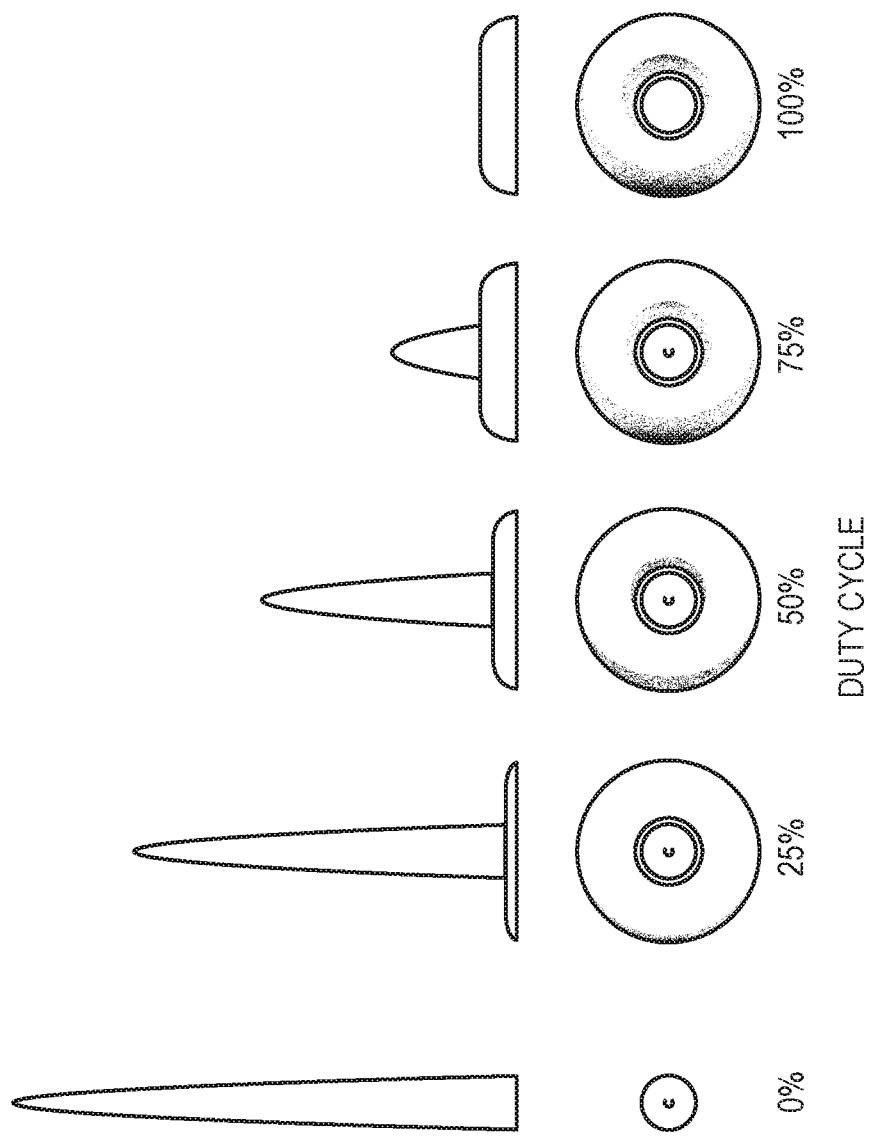
FIG. 2 is a set of exemplary images depicting side and plan views of spatial output profiles resulting from variation of the duty cycle of a control waveform used to direct laser energy to different regions of an optical fiber in accordance with various embodiments of the invention.

FIG. 2 depicts an exemplary set of images depicting side and plan views of spatial output profiles resulting from variation of the duty cycle of a square wave control waveform used to direct laser energy to either (1) a central circular core region or (2) an annular outer core region of the optical fiber. For example, as shown in FIG. 2, a duty cycle of 0% may correspond to all of the laser energy being directed into the central core, resulting in a tightly focused spot beam. A duty cycle of 100% may correspond to all of the laser energy being directed into the annular core, resulting in an annular beam shape. And, as shown in FIG. 2, duty cycles between 0% and 100% result in weighted averages of the two endpoint shapes. FIG. 2 depicts an exemplary embodiment, and other embodiments of the invention may form more complex averaged shapes by directing laser energy into other regions (or multiple regions at the same time), e.g., utilizing optical fibers with more complex interior configurations.

Figure 3:
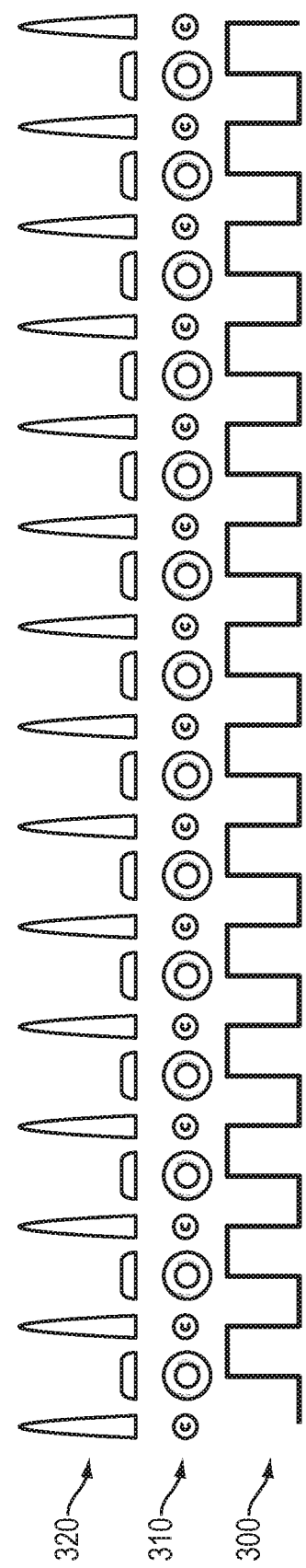
FIG. 3 is a set of exemplary images depicting side and plan views of spatial output profiles resulting from use of an example control waveform at a relatively slow frequency in accordance with various embodiments of the invention.

FIG. 3 depicts the use of a square-wave control waveform 300 representing a 50% duty cycle, as detailed above with respect to FIG. 2, at a relatively slow frequency for clarity. That is, the control waveform 300 dictates that half of the time the beam shape is a spot beam while the other half the beam shape is an annular beam, all while the beam is applied to a workpiece along a processing path. In FIG. 3, the resulting beam shape in response to the control waveform 300 is depicted in both plan view (as plan-view beam shape 310) and side view (as side-view beam shape 320). At the relatively slow frequency illustrated in FIG. 3, this shape change over time is sufficiently discrete that the output beam shape may simply toggle over the surface of the workpiece, rather than be averaged.

Figure 4:
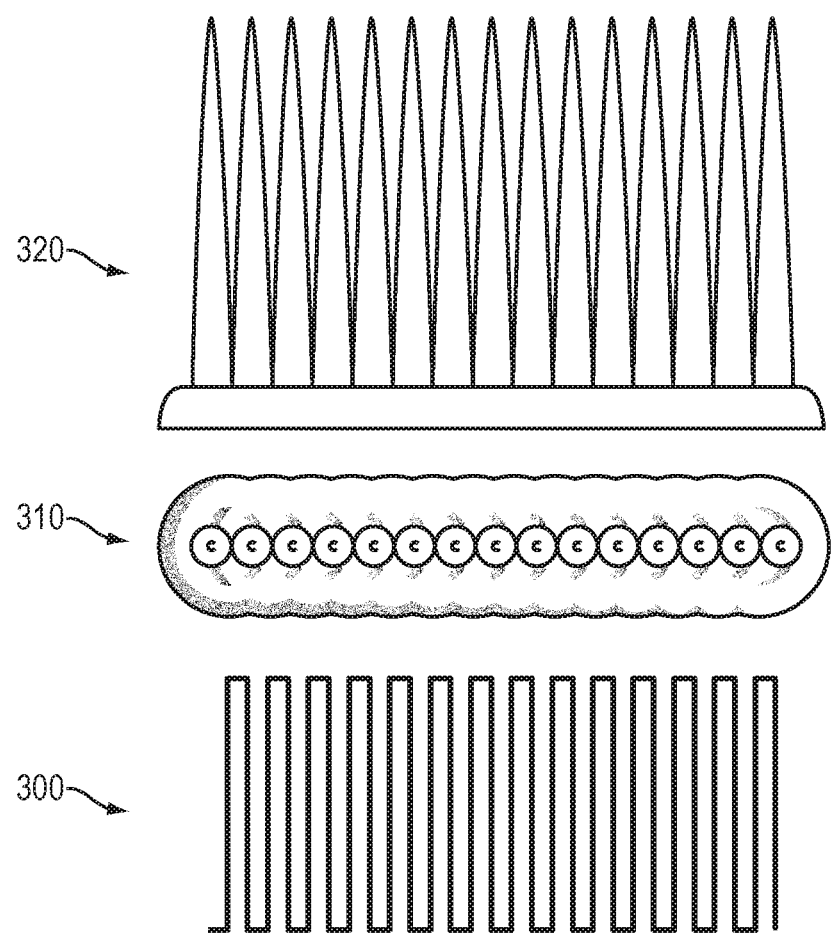
FIG. 4 is a set of exemplary images depicting side and plan views of spatial output profiles resulting from use of the control waveform of FIG. 3 but at a higher frequency in accordance with various embodiments of the invention.
Figure 5:
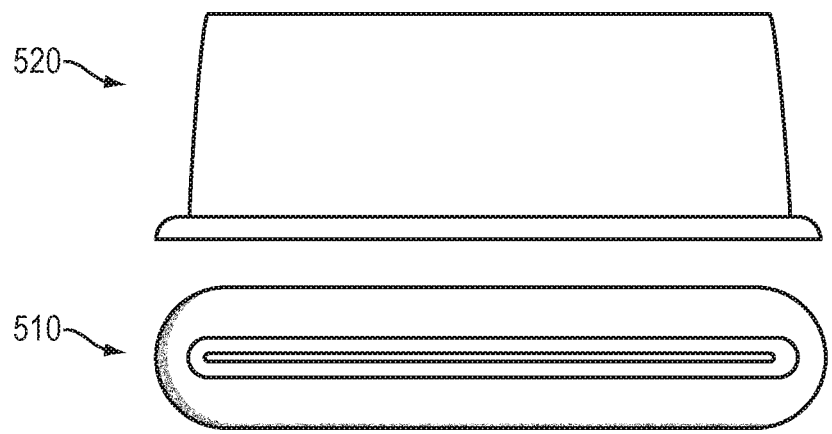
FIG. 5 is a set of exemplary images depicting side and plan views of average beam shape as experienced at the surface of a workpiece during relative motion between the workpiece and the beam, assuming an adequately high waveform frequency relative to the rate of beam movement along the workpiece in accordance with various embodiments of the invention.

For a given relative rate of movement between the laser beam and the workpiece, the frequency of the control waveform may be increased in order to produce a new, averaged output beam shape as the beam is applied to the workpiece. FIG. 4 depicts the same arrangement as depicted in FIG. 3 but with the frequency of the control waveform 300 increased. As shown, the higher frequency is sufficient to merge the discrete spatial beam profiles produced by the optical fiber into an average output shape that combines the spot and annular beam profiles. As relative motion is induced between the workpiece and the laser beam, the workpiece undergoes a time-based response to the output beam based on the output profile and the spatial power density thereof. Thus, in various embodiments of the invention, the minimum waveform frequency necessary to effectively merge the output beam shapes depends on the rate of movement between the beam and the workpiece. FIG. 5 depicts the average beam shape as applied to the surface of the workpiece during relative motion between the workpiece and the beam (as plan-view average beam shape 510 and side-view average beam shape 520), assuming an adequately high waveform frequency relative to the rate of beam movement along the workpiece. The controller 140 may ensure that an averaged output is obtained either by limiting the relative movement to a maximum processing speed (dictated by the waveform frequency and the material response time of the workpiece) or by ensuring a minimum waveform frequency whereby the response of the workpiece is the desired response—i.e., the response to the averaged output beam, rather than to different beam shapes at different locations along the processing path. The maximum processing speed or minimum waveform frequency will depend on the time-based response of the material to laser beam energy (e.g., the amount of time required to effect a desired change (e.g., a cut, melting, softening, etc.) in the material as a function of spatial beam energy), and may be obtained for a particular application without undue experimentation.

Embodiments of the invention may enable a user to process (e.g., cut or weld) a workpiece along a desired processing path, and the optimal beam shape and maximum processing speed is selected based on factors such as, but not limited to, the composition of the workpiece, the thickness of the workpiece, the reflectivity of the workpiece, the geometry of the processing path, etc. For example, a user may select or preprogram the desired processing path into the system using any suitable input device or by means of file transfer. Thereafter, the controller 140 may analyze the different output beam shapes enabled by the optical fiber of the system, the processing path, and the type and features (e.g., thickness) of the workpiece, querying its database as necessary. Based on this information, the system may determine optimum output beam shape as a function of location along the processing path, the control frequency and rate of relative motion required to produce the beam shape, and thus the maximum processing speed. In operation, the controller 140 may operate the laser system and positioning of the workpiece to process the workpiece along the preprogrammed path, maintaining the proper average beam shape to be experienced at the workpiece. If the composition and/or thickness of the material being processed changes, the location and nature of the change may be programmed, and the controller 140 may adjust the laser beam shape and/or the rate of relative motion between the workpiece and the beam accordingly.

In addition, the laser system may incorporate one or more systems for detecting the thickness of the workpiece and/or heights of features thereon. For example, the laser system may incorporate systems (or components thereof) for interferometric depth measurement of the workpiece, as detailed in U.S. patent application Ser. No. 14/676,070, filed on Apr. 1, 2015, the entire disclosure of which is incorporated by reference herein. Such depth or thickness information may be utilized by the controller to control the output beam shape to optimize the processing (e.g., cutting or welding) of the workpiece, e.g., in accordance with records in the database corresponding to the type of material being processed.

Figure 6:
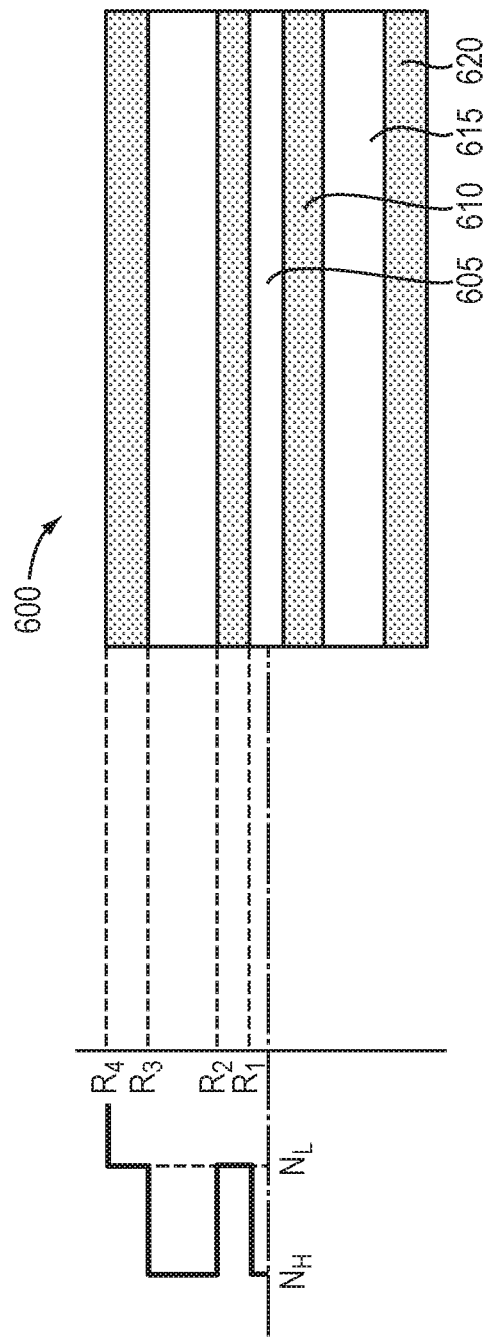
FIG. 6A is a schematic cross-section of an optical fiber in accordance with various embodiments of the invention.
FIG. 6B is a schematic diagram of refractive indices of the various layers of the optical fiber of FIG. 6A.

As mentioned above, embodiments of the invention may be utilized with and/or incorporate optical fibers having many different configurations. For example, FIG. 6A shows a double-clad fiber 600 having a center core 605, an interior cladding 610, an annular core 615, and an exterior cladding 620. The radius of each layer (core or cladding) of the fiber 600 is represented by $R_1$, $R_2$, $R_3$, or $R_4$, as shown in FIG. 6B. In double-clad fiber 600, the two cores 605, 615 may have the same higher refractive index, $N_H$, and the two claddings 610, 620 may have the same lower refractive index, $N_L$, as shown in FIG. 6B, and, therefore, the two cores 605, 615 may have the same numerical aperture (NA) of sqrt($N_H^2$-$N_L^2$). In other embodiments, the refractive indices of cores 605, 615 and/or of claddings 610, 620 may be different from each other.

In addition, embodiments of the invention may utilize optical fibers described in U.S. patent application Ser. No. 15/479,745, filed on Apr. 5, 2017, the entire disclosure of which is incorporated by reference herein. Thus, embodiments of the invention involve coupling of the laser beam into a multi-clad optical fiber herein termed a "step-clad fiber." One exemplary step-clad fiber includes, consists essentially of, or consists of a center core, a first cladding disposed around the center core, the first annular core disposed around the first cladding, and a second cladding disposed around the first annular core. Step-clad fibers in accordance with embodiments of the invention are not limited to having only a single annular core and two claddings—one or more additional annular cores and associated claddings may be disposed around the second cladding. As utilized herein, the term "annular core" is defined as a ring-shaped region having a higher refractive index than both the inner and outer layers adjacent thereto. Layers other than the center core and the annular core(s) are typically claddings in a step-clad fiber. Such claddings have lower refractive indices than at least one layer adjacent thereto.

Figure 7:
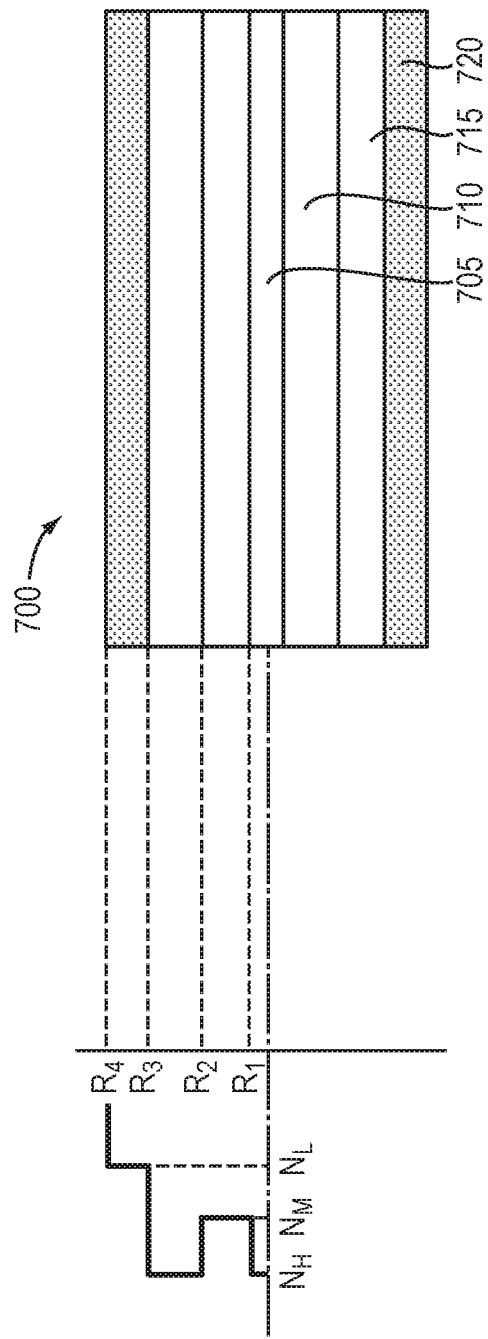
FIG. 7A is a schematic cross-section of a step-clad optical fiber in accordance with various embodiments of the invention.
FIG. 7B is a schematic diagram of refractive indices of the various layers of the optical fiber of FIG. 7A.

FIG. 7A depicts an exemplary step-clad fiber 700 that includes, consists essentially of, or consists of a center core 705, a first cladding 710, an annular core 715, and a second cladding 720. FIG. 7B depicts the refractive index and radius of each layer of the step-clad fiber 700. As shown, the refractive index ($N_M$) of the first cladding 710 of the fiber 700 has a value between a high index $N_H$ (not necessarily the high index of FIG. 6B) and a low index $N_L$ (not necessarily the low index of FIG. 6B), so that the center core 705 will have a smaller NA, given by sqrt($N_H^2$-$N_M^2$), than the NA of the annular core 715, given by sqrt($N_H^2$-$N_L^2$). While FIG. 7B depicts the indices of refraction of the center core 705 and the annular core 715 as being approximately equal to each other, in various embodiments the index of refraction of the annular core 715 may be different from (i.e., either less than or greater than) the index of refraction of the center core 705; however, in general, the index of refraction of the annular core 715 remains larger than the index of refraction of the first cladding 710.

Embodiments of the invention may also utilize and/or incorporate optical fibers having configurations detailed in U.S. patent application Ser. No. 16/675,655, filed on Nov. 6, 2019, the entire disclosure of which is incorporated by reference herein. For example, optical fibers in accordance with embodiments of the invention feature an annular core region incorporating (i) a sub-region of graded refractive index, (ii) sub-regions having different refractive indices in a stepped profile, or (iii) a low-refractive-index barrier layer.

Figure 8:
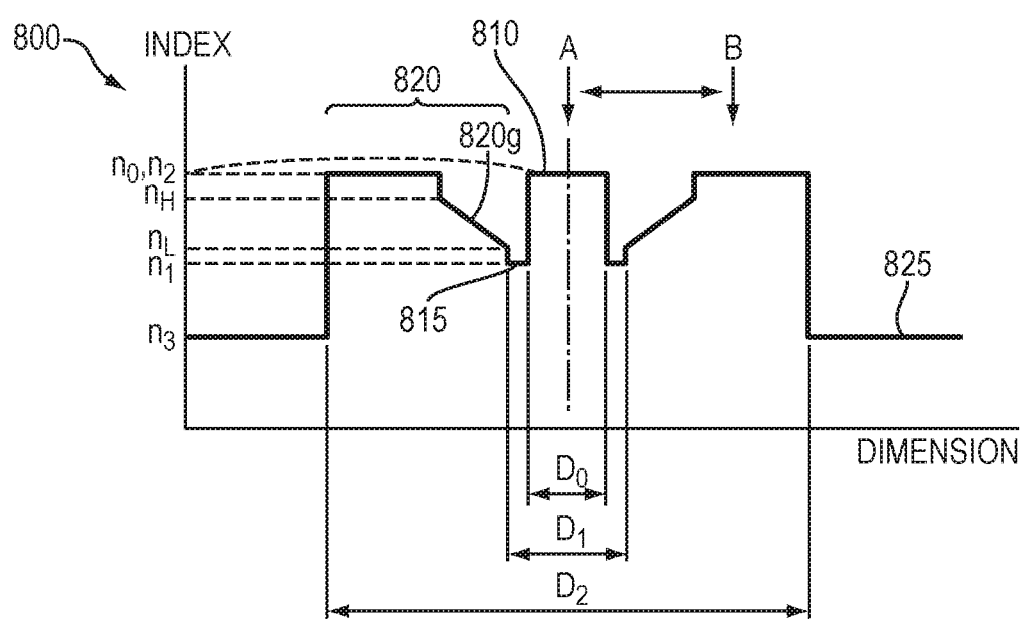
FIG. 8 is a schematic diagram of refractive indices of the various layers of an optical fiber in accordance with various embodiments of the invention.

FIG. 8 depicts the interior structure of a gradient step-clad optical fiber 800 in accordance with embodiments of the present invention. As shown, fiber 800 features a center core 810 having a diameter $D_0$ and a refractive index $n_0$, a first cladding 815 with a diameter $D_1$ and a refractive index $n_1$, an annular core 820 with a diameter $D_2$, and an exterior cladding 825 with a refractive index $n_3$. Similar to the step-clad fiber 700 shown in FIG. 7A, the first cladding 815 may have an intermediate index of refraction $n_1$, which is smaller than refractive index $n_0$ and larger than refractive index $n_3$. In various embodiments, the difference between $n_0$ and $n_1$ determines the NA of the center core 810, calculated by $NA_{core}$=sqrt($n_0^2$-$n_1^2$), and the difference between $n_0$ and $n_3$ determines, at least in part, the overall NA of the fiber 800, calculated by $NA_{fiber}$=sqrt($n_0^2$-$n_3^2$). Since $n_1$ is larger than $n_3$, $NA_{fiber}$ is larger than $NA_{core}$.

In various embodiments, the annular core 820 includes, consists essentially of, or consists of two different regions. As shown in FIG. 8, the annular core 820 may feature a graded-index region 820g and a constant-index region having a refractive index $n_2$. In the graded-index region 820g, the refractive index varies between a low refractive index $n_L$ and a high refractive index $n_H$. In various embodiments, the low refractive index $n_L$ may be approximately equal to or higher than the refractive index $n_1$ of the first cladding 815, and the high refractive index $n_H$ may be approximately equal to or lower than the refractive index $n_2$ of the constant-index region. In various embodiments, $n_2$ may be approximately equal to $n_0$, as shown in FIG. 8. In other embodiments, $n_2$ may be larger or smaller than $n_0$. These relationships between $n_2$ and $n_0$ may apply to any of the optical fibers in accordance with embodiments of the invention detailed herein.

In accordance with various embodiments of the invention, the diameters of core and cladding regions may depend at least in part on various properties (e.g., output power) of the laser source and/or on the desired BPP range of the output beam to be transmitted by the optical fiber. For example, a center core diameter $D_0$ of approximately 100 μm, matched with a laser source having a BPP of about 3.5 mm-mrad, will typically result in a relatively low output NA (approximately 0.09) with a minimum BPP of approximately 4 mm-mrad. Continuing the example, if the desired BPP variation range is about a factor of 6, the diameter $D_2$ of the annular core 320 may be approximately 600 μm, not considering NA enlargement that may occur when some laser power is in-coupled into the first cladding 815 and/or into a portion (e.g., the lower-index portion) of the graded-index region 820g. Assuming the NA of the center core 810 is approximately 0.12 and the laser input NA is approximately 0.085, the enlarged NA will be approximately 0.147 (=sqrt(0.12×0.12+ 0.085×0.085)), which is larger than the input NA by a factor of 1.7. As mentioned, the effective enlargement of the overall output NA may be smaller than this factor of 1.7 because, in various embodiments, not all of the input power is coupled into low-index regions or exits from high-index regions. Assuming that the overall NA enlargement is approximately 1.5, then the annular core diameter may be reduced to approximately 400 μm to achieve the same desired range of BPP variation. A smaller diameter of the annular core may result in higher intensity of the output beam, which may be beneficial in many high-power laser applications. In various embodiments, the ratio of the diameter $D_2$ to the diameter $D_0$ ranges from approximately 2.5 to approximately 8, or approximately 3 to approximately 6. This ratio may be applied to all different optical-fiber embodiments detailed herein.

In various embodiments, the thickness of the first cladding 815 (i.e., $((D_1-D_0)/2)$ may be less than approximately one-half of the diameter $D_0$ (i.e., less than approximately $D_0/2$). This thickness of the first cladding may be applied to all different optical-fiber embodiments detailed herein. For optical fiber 800, the thickness of the first cladding 815 may be even smaller, e.g., less than approximately 25%, less than approximately 10%, or even less than approximately 5% of the diameter $D_0$, due to, e.g., the presence of the lower-index portion of the graded-index region 820g.

Advantageously, laser energy coupled into the refractive-index profile of the annular core 820, including the graded-index region 820g, will result in output beams having annular beams with different effective diameters and widths, depending upon the input location in annular core 820. Thus, when the beam shape is altered in response to the control waveform, as detailed above, the use of fiber 800 enables a variety of different average beam shapes experienced at the workpiece. In various embodiments, the graded-index region 820g provides and enables different critical-angle interface locations of total internal reflection of input beams having different NAs. For example, laser power with an input NAin in-coupled into the constant-index region of annular core 820 will typically not spread within the entire annular core 820, but will rather be contained within a more limited area having a refractive index larger than $n_x$ (which is greater than $n_1$) that satisfies sqrt($n_2^2-n_x^2$)=NAin. In other words, the portion of annular core 820 having refractive index $n_x$ acts as a ray stopper. Similarly, different portions of the input power in the NA domain will have different input NA ranging from 0 to NAin, and these different portions will therefore be "blocked" by different portions (i.e., cylindrical "interfaces") within the annular core 820. In general, a z-portion of power having an input NAz (which is less than or equal to NAin) in-coupled into the annular core 820 at position y having a relatively high refractive index $n_y$ will be confined within a volume in the annular core 820 having refractive index larger than $n_x$ and that satisfies sqrt($n_y^2-n_x^2$)=NAz. This equation applies to all the embodiments of the invention. This general proposition may be applied to any and all different embodiments of the invention detailed herein.

In various embodiments, compared to the step-clad optical fiber 700 depicted in FIG. 7A, the gradient step-clad optical fiber 800 provides a wider variety of beam shapes and may therefore be deployed to meet the requirements of a wider variety of applications and workpieces processed by its output beams. As the general equation described above indicates, changes of input location (y) will typically result in different annular rings in the output beam having different cross-sectional profiles in intensity and width. Changes in input location may also generate annular rings of different effective diameters, particularly if the gradient-index region 820g is disposed at or near the outer edge of the annular core 820. Conventional fibers (e.g., optical fiber 700) will not exhibit such dynamics because laser power in-coupled into the annular core region of such fibers will spread nearly evenly over the entire annular core region.

In addition, as indicated by the double-headed arrow between locations A and B in FIG. 8, the gradient step-clad optical fiber 800 enables the laser input spot to be continuously shifted from location A to location B (e.g., in response to a desired control waveform) without appreciable loss of power, given that the laser input $NA_{in}$ is not larger than the NA of the first cladding 815, which is equal to sqrt($n_1^2-n_3^2$).

In various embodiments, the refractive-index profile (i.e., the variation of the refractive index as a function of position) of the graded-index region 820g may be a substantially linear gradient, as shown in FIG. 8. In other embodiments, the profile may have other shapes, including parabolic, root-square, polynomial, stepped (i.e., composed of discrete steps in refractive index), or any other monotonic curve. In various embodiments, the graded-index region 820g may be disposed between first cladding 815 and the constant-index region of annular core 820, as shown in FIG. 8. In other embodiments, the graded-index region 820g may instead be disposed between the constant-index region and the exterior cladding 825, or graded-index regions may be disposed on both sides of the constant-index region. In such embodiments, the refractive index of the constant-index region may be between $n_0$ and $n_1$ depicted in FIG. 8.

In various embodiments, the annular cladding 820 may entirely consist of the graded-index region 820g; that is, the width of the constant-index region of annular cladding 820 may be approximately zero. In addition or instead, the graded-index region 820g may extend such that it interfaces with the center core 810, i.e., the width of the first cladding 815 may be approximately zero. In various embodiments, the refractive index $n_2$ and/or $n_H$ within the annular core 820 may be smaller, larger, or approximately equal to $n_0$, i.e., the refractive index of the center core 810. Finally, although not depicted in FIG. 8, the gradient step-clad optical fiber 800 may also include one or more additional cladding layers disposed outside the exterior cladding 825. Such claddings (which may include, consist essentially of, or consist of, for example, coating layers and/or protective sheaths) may be primarily protective in nature and thus may not directly transmit laser energy therewithin. The refractive indices of such layers may be lower than $n_3$, the refractive index of exterior cladding 825. In other embodiments, the refractive indices of such layers may be higher than $n_3$. In various embodiments, optical fibers have an outer glass layer having approximately the same refractive index as that of the center core directly surrounding the exterior cladding 825, and then one or more (e.g., one or two) coating layers disposed thereover, each having a refractive index lower than $n_3$.

Figure 9:
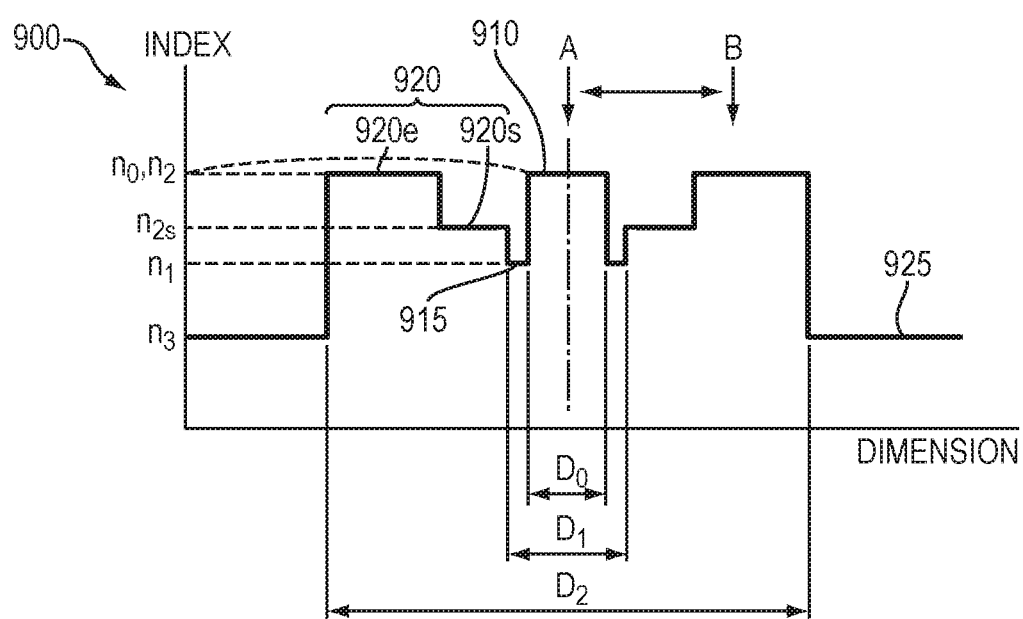
FIG. 9 is a schematic diagram of refractive indices of the various layers of an optical fiber in accordance with various embodiments of the invention.

FIG. 9 depicts the interior structure of another optical fiber according to embodiments of the present invention. As shown, multi-step clad optical fiber 900 features a center core 910 having a diameter $D_0$ and a refractive index $n_0$, a first cladding 915 with a diameter $D_1$ and a refractive index $n_1$, an annular core 920 with a diameter $D_2$, and an exterior cladding 925 with a refractive index $n_3$. Similar to fiber 800 shown in FIG. 8, the first cladding 915 may have an intermediate index of refraction $n_1$, which is smaller than refractive index $n_0$ and larger than refractive index $n_3$.

In various embodiments, the annular core 920 includes, consists essentially of, or consists of two different regions. As shown in FIG. 9, the annular core 920 may feature an interior step-index region 920s having a refractive index $n_{2s}$, and an exterior step-index region 920e having a refractive index $n_2$. In various embodiments, the refractive index $n_{2s}$ is larger than refractive index $n_1$ of the first cladding 915 and smaller than refractive index $n_2$. In accordance with various embodiments of the invention, laser power coupled into the exterior step-index region 920e will primarily remain within the exterior step-index region 920e, and power coupled into the interior step-index region 920s will be primarily contained within both regions 920s, 920e; therefore, laser energy coupled into either or both of these regions will result in output beams having annular beams with different effective diameters and widths, depending upon the input location in annular core 920 (similar to the discussion regarding fiber 800 above).

For multi-step clad optical fiber 900, in accordance with various embodiments, the thickness of interior step-index region 920s may be greater than or equal to approximately 10% of the center core diameter $D_0$, or even greater than or equal to approximately 25% of $D_0$. Such values may be applied to the thickness of the first cladding 915 as well. In various embodiments, the thickness of one or more layers of the optical fiber depends on the center-core diameter $D_0$ because the spot size of the input laser beam may be, for example, approximately 60% to approximately 90% of $D_0$.

In various embodiments, compared to the step-clad optical fiber 700 depicted in FIG. 7A, the multi-step clad optical fiber 900 provides a wider variety of beam shapes and may therefore be deployed to meet the requirements of a wider variety of applications and workpieces processed by its output beams in response to a desired control waveform. For example, multi-step clad optical fiber 900 provides two discrete regions 920s, 920e within the annular core 920 for receiving laser-energy input and that will respectively result in different annular ring profiles not obtainable with fibers such as fiber 700. In various embodiments, the presence of discrete regions 920s, 920e enables the manipulation of an annular-ring profile (e.g., intensity and/or width) via changes in the input power ratios between the two sections.

In various embodiments, the annular core 920 may include, consist essentially of, or consist of more than two different regions having different refractive indices. In addition, in various embodiments, the refractive index $n_2$ of the exterior step-index region 920e may be larger than refractive index $n_{2s}$ of the interior step-index region 920s, as shown in FIG. 9, or $n_2$ may be smaller than $n_{2s}$.

Figure 10A:
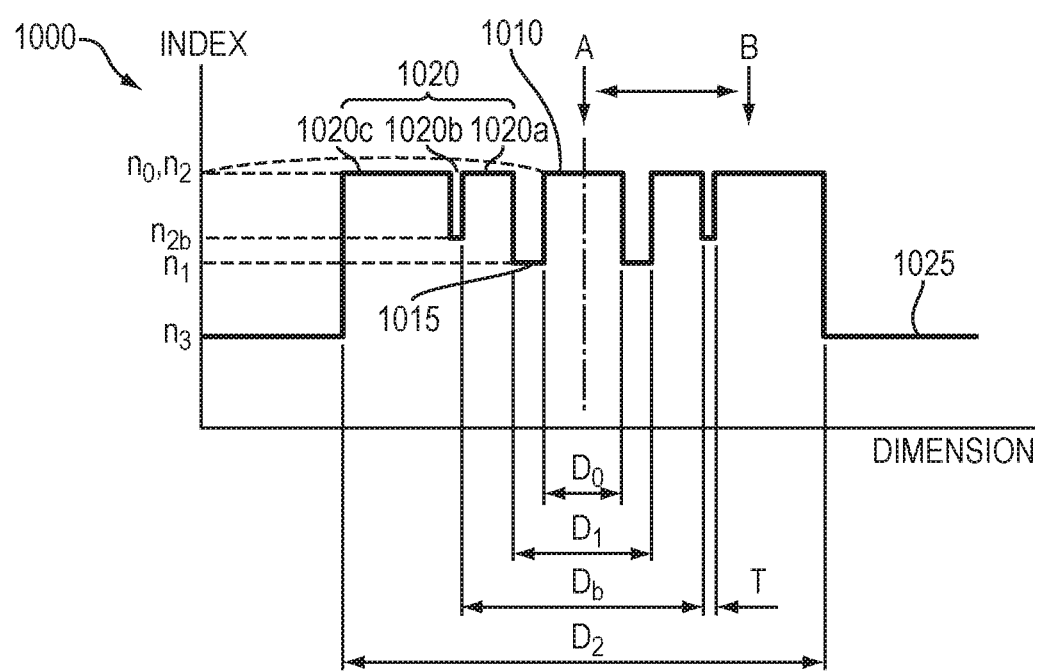
FIG. 10A is a schematic diagram of refractive indices of the various layers of an optical fiber in accordance with various embodiments of the invention.

FIG. 10A depicts the interior structure of another optical fiber according to embodiments of the present invention. As shown, barrier step-clad optical fiber 1000 features a center core 1010 having a diameter $D_0$ and a refractive index $n_0$, a first cladding 1015 with a diameter $D_1$ and a refractive index $n_1$, an annular core 1020 with a diameter $D_2$, and an exterior cladding 1025 with a refractive index $n_3$. Similar to fibers 800 and 900, the first cladding 1015 may have an intermediate index of refraction which is smaller than refractive index $n_0$ and larger than refractive index $n_3$.

In various embodiments, the annular core 1020 includes, consists essentially of, or consists of three different regions. As shown in FIG. 10A, the annular core 1020 may feature an inner region 1020a, an outer region 1020c, and a barrier region 1020b disposed between regions 1020a, 1020c. In various embodiments, the refractive indices of both regions 1020a, 1020c are equal to refractive index $n_2$, which may be approximately equal to the refractive index $n_0$ of the center core 1010. In other embodiments, $n_2$ may be greater than or less than $n_0$. The refractive index $n_{2b}$ of the barrier region 1020b is smaller than $n_2$, and may be larger than or approximately equal to the refractive index $n_1$ of the first cladding 1015. As shown in FIG. 10A, the barrier region 1020b may have an inner diameter $D_b$, which is larger than the diameter $D_1$ of the first cladding 1015, and a layer thickness T. In various embodiments, the layer thickness T of the barrier region 1020b is less than approximately 30 µm, less than approximately 20 µm, or less than approximately 10 µm. The layer thickness T may be greater than approximately 1 µm, greater than approximately 2 µm, greater than approximately 5 µm, or greater than approximately 10 µm.

In various embodiments of the invention, the barrier region 1020b, together with the first cladding 1015 and the exterior cladding 1025, will substantially stop laser power from spreading over to other regions of fiber 1000 when the power is initially coupled into either the inner region 1020a or the outer region 1020c; therefore, output beams in accordance with embodiments of the invention may feature two discrete annular rings at the fiber exit, at least prior to averaging in response to a desired output waveform. That is, fiber 1000 enables the formation of output beams having two annular rings with different output intensities via distribution of input laser power between regions 1020a, 1020c. Such output beams are typically not enabled via the use of fibers 600, 700 detailed above. Moreover, laser power in-coupled into the barrier region 1020b will typically not be lost from the output beam but will instead spread throughout the annular core 1020.

In various embodiments, of the invention, laser power coupled into the first cladding 1015 will tend to spread over to the entire annular core region 1020, and such power may also spread over to the center core 1010. Thus, coupling beam energy into the first cladding 1015 may result in a larger effective beam size at the fiber exit than coupling into inner region 1020a. Therefore, in embodiments of the invention a non-monotonic increase in output beam size results as the laser energy is coupled into the various regions of fiber 1000, resulting in dynamic BPP variations not enabled via use of fibers 600, 700.

In various embodiments of the invention, the annular core region 1020 may include more than one barrier region 1020b, and each barrier region may have a different thickness and/or a different refractive index, although the refractive indices of such barrier layers are typically smaller than refractive index $n_2$ and larger than or approximately equal to refractive index $n_1$. That is, the annular core region 1020 may be divided into N+1 regions (e.g., regions 1020a, 1020c) by N barrier regions 1020b. The thickness and/or refractive index of two or more (or even all) of the multiple barrier regions 1020b may be equal to each other or different from each other.

Figure 10B:
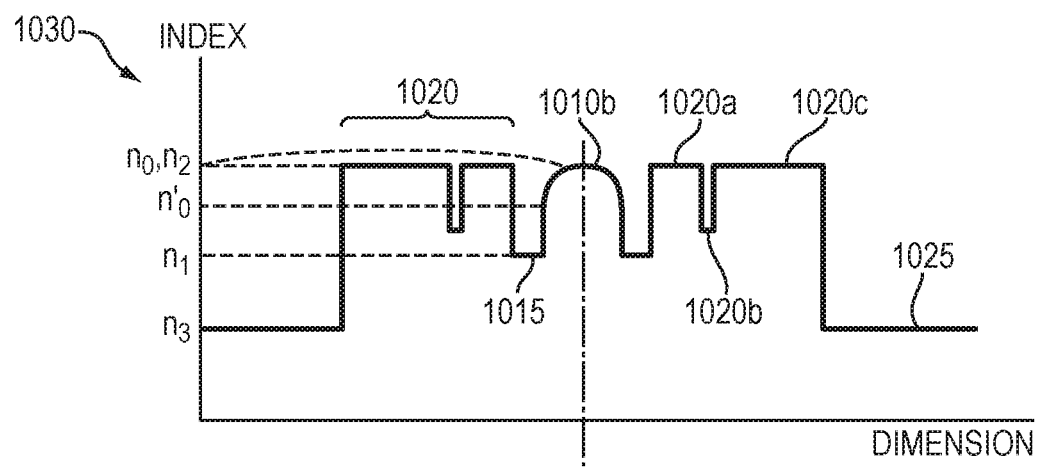
FIG. 10B is a schematic diagram of refractive indices of the various layers of an optical fiber in accordance with various embodiments of the invention.

FIG. 10B depicts the interior structure of an optical fiber according to embodiments of the present invention that is a variant of barrier step-clad optical fiber 1000 depicted in FIG. 10A. As shown, barrier step-clad optical fiber 1030 features a center core 1010b, first cladding 1015, annular core 1020, and exterior cladding 1025. Similar to fibers 800, 900, and 1000, the first cladding 1015 may have an intermediate index of refraction $n_1$, which is smaller than refractive index $n_0$ and larger than refractive index $n_3$.

As shown in FIG. 10B, center core 1010b has a gradient-index profile, in which the center point of center core 1010b has the highest refractive index $n_0$, and the refractive index of center core 1010b decreases as a function of radial distance away from the center point. In various embodiments, only the center point of the center core 1010b has the highest refractive index $n_0$, while in other embodiments, center core 1010b has a central portion having a finite thickness and having the highest refractive index $n_0$. (That is, the refractive index of the center core 1010b may plateau over a central portion and then decrease toward the outer perimeter of center core 1010b.) The decrease in the refractive index of center core 1010b may be substantially linear, parabolic, or may have another shape such as a polynomial dependence. In other embodiments, the refractive index of center core 1010b may decrease in a series of one or more (or even two or more) discrete steps. In various embodiments, the refractive index of center core 1010b decreases to a refractive index $n'_0$ at the interface between center core 1010b and first cladding 1015. As shown, the refractive index n'o may be larger than the refractive index $n_1$ of the first cladding 1015. In other embodiments, the refractive index $n'_0$ may be approximately equal to the refractive index $n_1$ of the first cladding 1015.

As with optical fiber 1000 of FIG. 10A, in various embodiments of the invention, the annular core region 1020 of fiber 1030 may include more than one barrier region 1020b, and each barrier region may have a different thickness and/or a different refractive index, although the refractive indices of such barrier layers are typically smaller than refractive index $n_2$ and larger than or approximately equal to refractive index $n_1$.

In embodiments of the invention, the beam is steered into two or more different optical fibers (e.g., fibers within a fiber bundle) instead of or in addition to being steered into two or more different locations within the fiber(s). FIG. 11A depicts a laser system 1100 in accordance with various embodiments of the present invention. As shown, laser beam 115 (which may be, e.g., the output beam of a WBC system) is directed by switching mechanism 110 and coupled by optical element 120 (e.g., one or more lenses) into one of multiple fibers of a fiber bundle 1110, which includes, consists essentially of, or consists of two or more optical fibers 105, at least two (or even all) of which may have different internal configurations (e.g., numbers of cladding layers, number of cores, refractive indices of cores and/or claddings, sizes of cores and/or claddings, etc.). Each of the optical fibers 105 of the fiber bundle 1110 may be connected to a laser head 1120 that may include, for example, further optics for directing the output laser beam toward a workpiece for materials processing such as cutting, welding, etc. FIG. 11A depicts an exemplary embodiment in which the laser beam 115 is being coupled to two different optical fibers 105 within fiber bundle 1110 via movement (e.g., rotation and/or translation) of the switching mechanism 110. In various embodiments of the invention, the fibers 105 of the fiber bundle 1110 may have the internal configurations of any of the optical fibers detailed herein. Two or more of the fibers 105 of the fiber bundle 1110 may have the same internal configuration (e.g., shape and size of core(s) and/or cladding(s)), and/or two or more of the fibers 105 of the fiber bundle 1110 may have different internal configurations. FIG. 11B depicts a schematic end-on view of the fiber bundle 1110. Although FIG. 11B depicts the fibers of the fiber bundle 1110 arranged in a close-packed, round configuration, embodiments of the invention also include other arrangements of the fibers within the fiber bundle 1110, e.g., a linear stack.

In various embodiments of the invention, in order to reduce the risk of damage to the fibers 105, the input side of the fiber bundle 1110 is attached (e.g., via fusion) to a glass endcap. That is, the input side of the fiber bundle may be a unitary segment within which the different fibers 105 are coupled to different areal portions of the glass endcap. The glass endcap (not shown in FIG. 11A) may have a length of, e.g., at least 5 mm. The length of the endcap may be, e.g., 50 mm or less. As shown in FIG. 11B, the fibers, at least at the input end of fiber bundle 1110, may be disposed within a sheath 1130.

As shown in FIG. 11A, the laser system 1100 incorporates controller 140 that controls the movement of the laser beam 115 among the various fibers 105 of the fiber bundle 1110 in accordance with the control waveform generated by waveform generator 150. For example, the controller 140 may control the movement (e.g., rotation and/or translation with respect to one, two or three degrees of freedom) of switching mechanism 110, the optical element 120, and/or the fiber bundle 1110 in order to cause the laser beam 115 to be directed into a different fiber 105 or a different portion of a fiber 105 in fiber bundle 1110, as detailed above.

Figure 12:
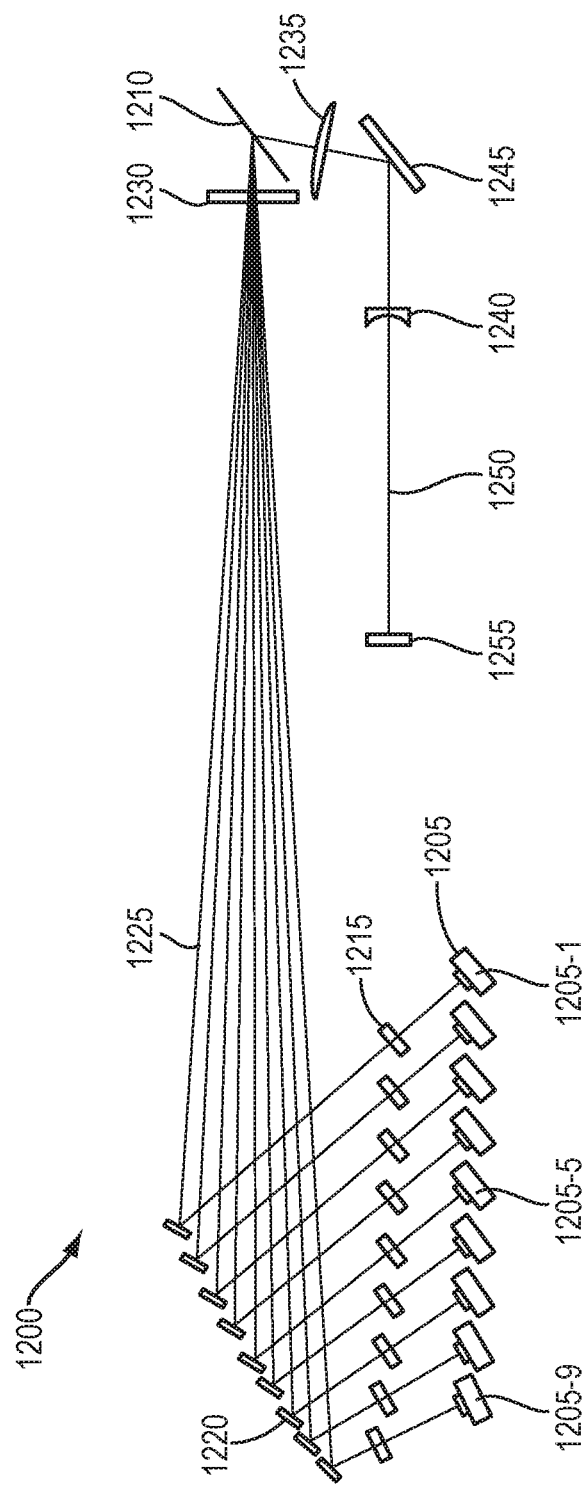
FIG. 12 is a schematic diagram of a wavelength beam combining (WBC) resonator in accordance with embodiments of the invention.

Laser systems and laser delivery systems in accordance with embodiments of the present invention and detailed herein may be utilized in and/or with WBC laser systems. Specifically, in various embodiments of the invention, multi-wavelength output beams of WBC laser systems may be utilized as the input beams for laser beam delivery systems for waveform-based control as detailed herein. FIG. 12 schematically depicts various components of a WBC laser system (or "resonator") 1200 that may be utilized to form input beams used in embodiments of the present invention. In the depicted embodiment, resonator 1200 combines the beams emitted by nine different diode bars (as utilized herein, "diode bar" refers to any multi-beam emitter, i.e., an emitter from which multiple beams are emitted from a single package). Embodiments of the invention may be utilized with fewer or more than nine emitters. In accordance with embodiments of the invention, each emitter may emit a single beam, or, each of the emitters may emit multiple beams. The view of FIG. 12 is along the WBC dimension, i.e., the dimension in which the beams from the bars are combined. The exemplary resonator 1200 features nine diode bars 1205, and each diode bar 1205 includes, consists essentially of, or consists of an array (e.g., one-dimensional array) of emitters along the WBC dimension. In various embodiments, each emitter of a diode bar 1205 emits a non-symmetrical beam having a larger divergence in one direction (known as the "fast axis," here oriented vertically relative to the WBC dimension) and a smaller divergence in the perpendicular direction (known as the "slow axis," here along the WBC dimension).

In various embodiments, each of the diode bars 1205 is associated with (e.g., attached or otherwise optically coupled to) a fast-axis collimator (FAC)/optical twister microlens assembly that collimates the fast axis of the emitted beams while rotating the fast and slow axes of the beams by 90°, such that the slow axis of each emitted beam is perpendicular to the WBC dimension downstream of the microlens assembly. The microlens assembly also converges the chief rays of the emitters from each diode bar 1205 toward a dispersive element 1210. Suitable microlens assemblies are described in U.S. Pat. No. 8,553,327, filed on Mar. 7, 2011, and U.S. Pat. No. 9,746,679, filed on Jun. 8, 2015, the entire disclosure of each of which is hereby incorporated by reference herein.

In embodiments of the invention in which both a FAC lens and an optical twister (e.g., as a microlens assembly) are associated with each of the beam emitters and/or emitted beams, and SAC lenses (as detailed below) affect the beams in the non-WBC dimension. In other embodiments, the emitted beams are not rotated, and FAC lenses may be utilized to alter pointing angles in the non-WBC dimension. Thus, it is understood that references to SAC lenses herein generally refer to lenses having power in the non-WBC dimension, and such lenses may include FAC lenses in various embodiments. Thus, in various embodiments, for example embodiments in which emitted beams are not rotated and/or the fast axes of the beams are in the non-WBC dimension, FAC lenses may be utilized as detailed herein for SAC lenses.

As shown in FIG. 12, resonator 1200 also features a set of SAC lenses 1215, one SAC lens 1215 associated with, and receiving beams from, one of the diode bars 1205. Each of the SAC lenses 1215 collimates the slow axes of the beams emitted from a single diode bar 1205. After collimation in the slow axis by the SAC lenses 1215, the beams propagate to a set of interleaving mirrors 1220, which redirect the beams 1225 toward the dispersive element 1210. The arrangement of the interleaving mirrors 1220 enables the free space between the diode bars 1205 to be reduced or minimized. Upstream of the dispersive element 1210 (which may include, consist essentially of, or consist of, for example, a diffraction grating such as the transmissive diffraction grating depicted in FIG. 12, or a reflective diffraction grating), a lens 1230 may optionally be utilized to collimate the sub-beams (i.e., emitted rays other than the chief rays) from the diode bars 1205. In various embodiments, the lens 1230 is disposed at an optical distance away from the diode bars 1205 that is substantially equal to the focal length of the lens 1230. Note that, in typical embodiments, the overlap of the chief rays at the dispersive element 1210 is primarily due to the redirection of the interleaving mirrors 1220, rather than the focusing power of the lens 1230.

Also depicted in FIG. 12 are lenses 1235, 1240, which form an optical telescope for mitigation of optical cross-talk, as disclosed in U.S. Pat. No. 9,256,073, filed on Mar. 15, 2013, and U.S. Pat. No. 9,268,142, filed on Jun. 23, 2015, the entire disclosure of which is hereby incorporated by reference herein. Resonator 1200 may also include one or more optional folding mirrors 1245 for redirection of the beams such that the resonator 1200 may fit within a smaller physical footprint. The dispersive element 1210 combines the beams from the diode bars 1205 into a single, multi-wavelength beam 1250, which propagates to a partially reflective output coupler 1255. The coupler 1255 transmits a portion of the beam as the output beam of resonator 1200 while reflecting another portion of the beam back to the dispersive element 1210 and thence to the diode bars 1205 as feedback to stabilize the emission wavelengths of each of the beams.

EXAMPLE

Figure 13A:
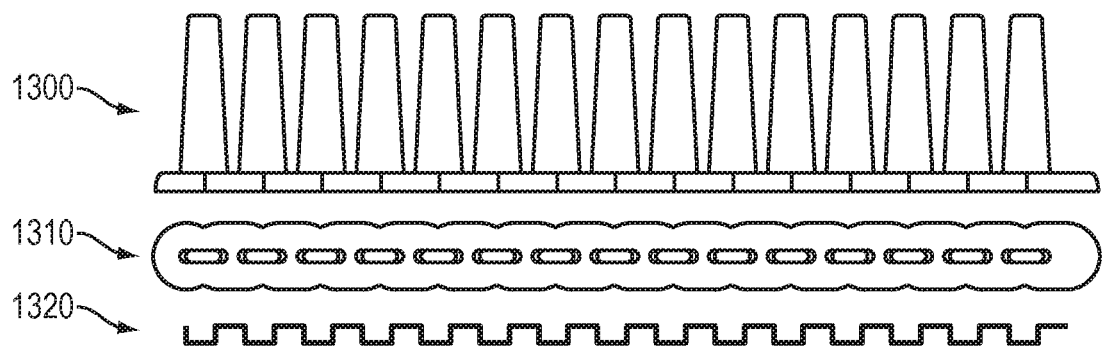
FIGS. 13A-13D are sets of exemplary images depicting side and plan views of averaged beam profiles at the surface of a workpiece resulting from use of example control waveforms in accordance with various embodiments of the invention.
Figure 13B:
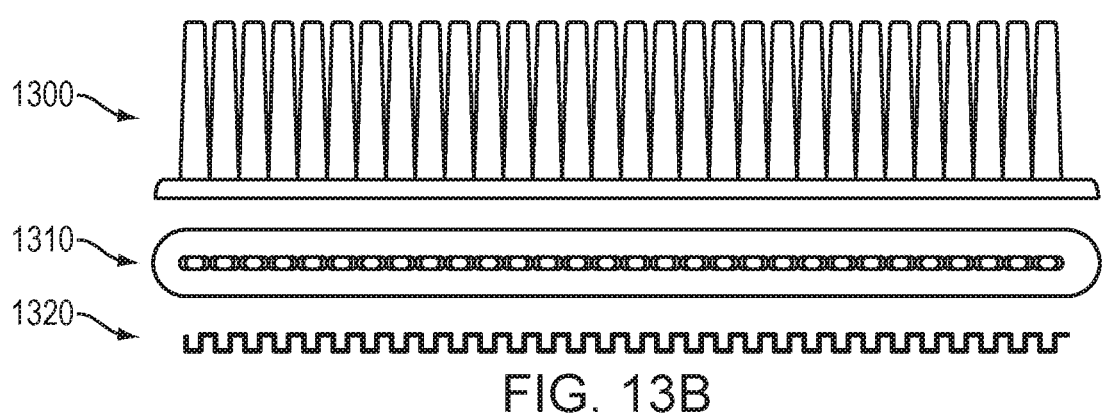
Figure 13C:
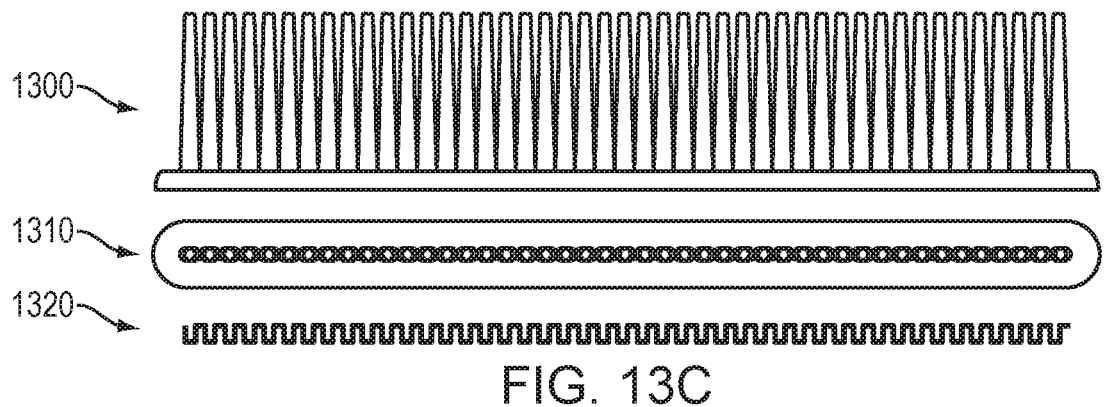
Figure 13D:
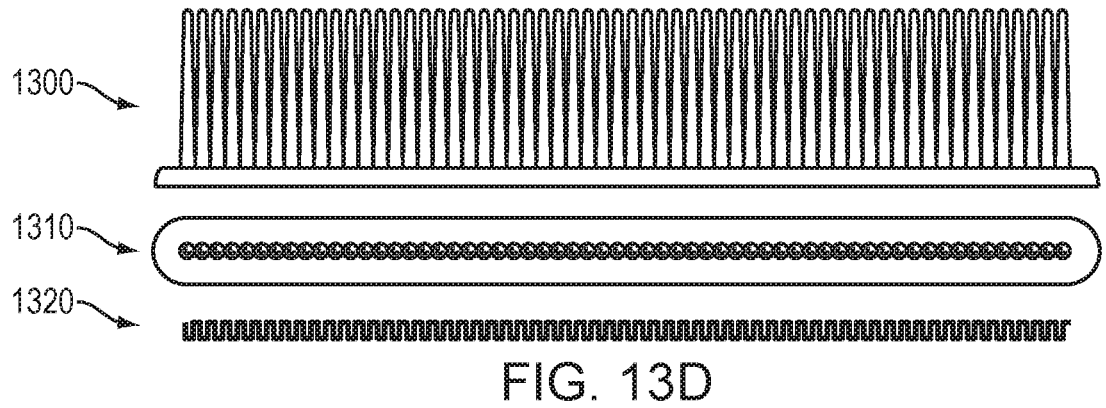

FIGS. 13A-13D depict sets of images showing side and plan views 1300, 1310 of spatial output profiles resulting from the variation of frequency of a square wave control waveform (having a 50% duty cycle), as well as the waveforms 1320 themselves, used to direct laser energy to two different portions of an optical fiber. In this example, the laser energy is utilized to weld an aluminum sheet having a thickness of 1.5 mm. The processing speed of the laser beam was 2 m/minute, and each of the FIGS. 13A-13D depicts 10 mm of travel along the aluminum sheet (i.e., 0.3 seconds of processing time). In each case, the beam is switched between a central core region and an annular core region of an optical fiber. The diameter of the central core was 100 µm, and the diameter of the annular core was 360 µm, and the central core and annular core were separated by a barrier (i.e., a cladding region) having a thickness of 30 µm. The laser beam was generated by a 2 kW continuous wave direct-diode laser system. FIG. 13A shows the resulting output for a control frequency of 50 Hz, while FIGS. 13B, 13C, and 13D correspond to control frequencies of 100 Hz, 150 Hz, and 200 Hz, respectively. In FIG. 13A, the individual beam outputs remain evident and are only overlapping slightly at their edges at the surface of the workpiece. As shown, as the control frequency increases, the beam outputs increasingly merge into the average beam profile, and higher frequencies result in that average beam profile (e.g., as also shown in FIG. 5).

For the welding process utilized in this example, the control frequency may be varied to vary the distance between "pierce points" at which the laser beam is utilized to penetrate through one or more layers of the workpiece to create spot welds. Equivalently, the processing speed (i.e., the relative rate of translation between the workpiece and the beam) may be varied while the control frequency is held constant. For example, this process may be utilized to replace the need for rivets between workpieces incorporating layers of dissimilar materials as the spot welds are formed through the various layers. The averaged/merged beam profile enabled by the high-frequency beam switching yields superior results, because the averaged beam size (which has a larger beam size than the pierce point) will pre-heat the workpiece, reducing thermal stress when the workpiece is penetrated at the pierce points. The thermal gradients in the workpiece are reduced, reducing the risk of cracking or fracture during processing. The use of the averaged beam shape also reduces material splattering, resulting in cleaner weld seams that do not require additional processing (e.g., grinding of weld seams prior to painting or other finishing processes).

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

The invention claimed is:

1. A method of processing a workpiece, the method comprising:
   providing a laser and an optical fiber having multiple interior regions, in-coupling of a laser emission into each of the interior regions causing the fiber to produce an output having a different spatial output profile;
   in a temporal pattern, steering the laser emission to a plurality of the interior regions of the fiber such that the output has different spatial output profiles; and
   while directing the output onto the workpiece to process the workpiece, causing relative movement therebetween,
   wherein:
   the temporal pattern has a frequency sufficient such that the workpiece is processed, during the relative movement between the workpiece and the output, by an effective output shape combining the different spatial output profiles,
   the workpiece undergoes a time-based response to the output based on the spatial output profile and a power density thereof, and
   the relative movement occurs no faster than a maximum processing speed, the maximum processing speed (i) being selected based on the time-based response of the workpiece and the frequency of the temporal pattern and (ii) ensuring that the response is to the effective output shape.

2. The method of claim 1, wherein each interior region of the fiber is a core region.

3. The method of claim 2, wherein the interior regions include at least a central first core and an annular second core surrounding the first core.

4. The method of claim 1, wherein at least one of the interior regions of the fiber is a core region and at least one of the interior regions of the fiber is a cladding region.

5. The method of claim 1, wherein the laser emission is steered in response to a control waveform.

6. The method of claim 5, wherein the control waveform is a square wave.

7. The method of claim 5, wherein the effective output shape is a weighted average of the different spatial output profiles based on a shape and duty cycle of the control waveform.

8. The method of claim 1, wherein the laser emission is a multi-wavelength beam.

9. The method of claim 1, wherein the laser emission is steered to the plurality of the interior regions of the fiber based on at least one of (i) a type of processing performed on the workpiece, (ii) a property of the workpiece, or (iii) a processing path along which the workpiece is processed.

10. The method of claim 9, wherein the laser emission is steered to the plurality of the interior regions of the fiber based on at least the type of processing, and the type of processing is selected from the list consisting of cutting, welding, etching, annealing, drilling, soldering, and brazing.

11. The method of claim 9, wherein the laser emission is steered to the plurality of the interior regions of the fiber based on at least the property of the workpiece, and the property of the workpiece comprises at least one of a thickness of the workpiece, a composition of the workpiece, a reflectivity of the workpiece, or a topography of the workpiece.

12. The method of claim 9, wherein the laser emission is steered to the plurality of the interior regions of the fiber based on one or more directional changes in the processing path.

13. The method of claim 1, wherein the laser comprises:
one or more beam emitters emitting a plurality of discrete beams;
focusing optics for focusing the plurality of beams toward a dispersive element;
the dispersive element for receiving and dispersing the received focused beams; and
a partially reflective output coupler positioned to receive the dispersed beams, transmit a portion of the dispersed beams therethrough as the laser emission, and reflect a second portion of the dispersed beams back toward the dispersive element,
wherein the laser emission is composed of multiple wavelengths.

14. The method of claim 13, wherein the dispersive element comprises a diffraction grating.

15. The method of claim 1, wherein the optical fiber comprises a fiber core, a first cladding region surrounding the fiber core, and a second cladding region surrounding the first cladding region.

16. The method of claim 1, wherein the optical fiber comprises a fiber core, a first cladding region surrounding the fiber core, an annular core surrounding the first cladding region, and a second cladding region surrounding the annular core.

17. The method of claim 1, wherein the optical fiber comprises (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index, wherein (i) the first refractive index is larger than the fourth refractive index, (ii) the third refractive index is larger than the fourth refractive index, and (iii) the second refractive index is smaller than the first refractive index and larger than the fourth refractive index.

18. The method of claim 17, wherein the third refractive index is larger than the first refractive index.

19. A method of processing a workpiece, the method comprising:
providing a laser and an optical fiber having multiple interior regions, in-coupling of a laser emission into each of the interior regions causing the fiber to produce an output having a different spatial output profile;
in a temporal pattern, steering the laser emission to a plurality of the interior regions of the fiber such that the output has different spatial output profiles; and
while directing the output onto the workpiece to process the workpiece, causing relative movement therebetween,
wherein:
the temporal pattern has a frequency sufficient such that the workpiece is processed, during the relative movement between the workpiece and the output, by an effective output shape combining the different spatial output profiles,
the laser emission is steered in response to a control waveform, and
the effective output shape is a weighted average of the different spatial output profiles based on a shape and duty cycle of the control waveform.

20. The method of claim 19, wherein each interior region of the fiber is a core region.

21. The method of claim 20, wherein the interior regions include at least a central first core and an annular second core surrounding the first core.

22. The method of claim 19, wherein at least one of the interior regions of the fiber is a core region and at least one of the interior regions of the fiber is a cladding region.

23. The method of claim 19, wherein the control waveform is a square wave.

24. The method of claim 19, wherein the laser emission is a multi-wavelength beam.

25. The method of claim 19, wherein the laser emission is steered to the plurality of the interior regions of the fiber based on at least one of (i) a type of processing performed on the workpiece, (ii) a property of the workpiece, or (iii) a processing path along which the workpiece is processed.

26. The method of claim 25, wherein the laser emission is steered to the plurality of the interior regions of the fiber based on at least the type of processing, and the type of processing is selected from the list consisting of cutting, welding, etching, annealing, drilling, soldering, and brazing.

27. The method of claim 25, wherein the laser emission is steered to the plurality of the interior regions of the fiber based on at least the property of the workpiece, and the property of the workpiece comprises at least one of a thickness of the workpiece, a composition of the workpiece, a reflectivity of the workpiece, or a topography of the workpiece.

28. The method of claim 25, wherein the laser emission is steered to the plurality of the interior regions of the fiber based on one or more directional changes in the processing path.

29. The method of claim 25, wherein the laser comprises:
one or more beam emitters emitting a plurality of discrete beams;
focusing optics for focusing the plurality of beams toward a dispersive element;
the dispersive element for receiving and dispersing the received focused beams; and
a partially reflective output coupler positioned to receive the dispersed beams therethrough as the laser emission, and reflect a second portion of the dispersed beams back toward the dispersive element, wherein the laser emission is composed of multiple wavelengths.

30. The method of claim 29, wherein the dispersive element comprises a diffraction grating.

31. The method of claim 19, wherein the optical fiber comprises a fiber core, a first cladding region surrounding the fiber core, and a second cladding region surrounding the first cladding region.

32. The method of claim 19, wherein the optical fiber comprises a fiber core, a first cladding region surrounding the fiber core, an annular core surrounding the first cladding region, and a second cladding region surrounding the annular core.

33. The method of claim 19, wherein the optical fiber comprises (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index, wherein (i) the first refractive index is larger than the fourth refractive index, (ii) the third refractive index is larger than the fourth refractive index, and (iii) the second refractive index is smaller than the first refractive index and larger than the fourth refractive index.

34. The method of claim 33, wherein the third refractive index is larger than the first refractive index.

35. A method of processing a workpiece, the method comprising:

providing a laser and an optical fiber having multiple interior regions, in-coupling of a laser emission into each of the interior regions causing the fiber to produce an output having a different spatial output profile;

in a temporal pattern, steering the laser emission to a plurality of the interior regions of the fiber such that the output has different spatial output profiles; and while directing the output onto the workpiece to process the workpiece, causing relative movement therebetween, wherein the temporal pattern has a frequency sufficient such that the workpiece is processed, during the relative movement between the workpiece and the output, by an effective output shape combining the different spatial output profiles, and wherein the laser comprises:

one or more beam emitters emitting a plurality of discrete beams;

focusing optics for focusing the plurality of beams toward a dispersive element;

the dispersive element for receiving and dispersing the received focused beams; and a partially reflective output coupler positioned to receive the dispersed beams, transmit a portion of the dispersed beams therethrough as the laser emission, and reflect a second portion of the dispersed beams back toward the dispersive element, wherein the laser emission is composed of multiple wavelengths.

36. The method of claim 35, wherein the dispersive element comprises a diffraction grating.

37. The method of claim 35, wherein each interior region of the fiber is a core region.

38. The method of claim 37, wherein the interior regions include at least a central first core and an annular second core surrounding the first core.

39. The method of claim 35, wherein at least one of the interior regions of the fiber is a core region and at least one of the interior regions of the fiber is a cladding region.

40. The method of claim 35, wherein the laser emission is steered in response to a control waveform.

41. The method of claim 40, wherein the control waveform is a square wave.

42. The method of claim 35, wherein the laser emission is steered to the plurality of the interior regions of the fiber based on at least one of (i) a type of processing performed on the workpiece, (ii) a property of the workpiece, or (iii) a processing path along which the workpiece is processed.

43. The method of claim 42, wherein the laser emission is steered to the plurality of the interior regions of the fiber based on at least the type of processing, and the type of processing is selected from the list consisting of cutting, welding, etching, annealing, drilling, soldering, and brazing.

44. The method of claim 42, wherein the laser emission is steered to the plurality of the interior regions of the fiber based on at least the property of the workpiece, and the property of the workpiece comprises at least one of a thickness of the workpiece, a composition of the workpiece, a reflectivity of the workpiece, or a topography of the workpiece.

45. The method of claim 42, wherein the laser emission is steered to the plurality of the interior regions of the fiber based on one or more directional changes in the processing path.

46. The method of claim 35, wherein the optical fiber comprises a fiber core, a first cladding region surrounding the fiber core, and a second cladding region surrounding the first cladding region.

47. The method of claim 35, wherein the optical fiber comprises a fiber core, a first cladding region surrounding the fiber core, an annular core surrounding the first cladding region, and a second cladding region surrounding the annular core.

48. The method of claim 35, wherein the optical fiber comprises (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index, wherein (i) the first refractive index is larger than the fourth refractive index, (ii) the third refractive index is larger than the fourth refractive index, and (iii) the second refractive index is smaller than the first refractive index and larger than the fourth refractive index.

49. The method of claim 48, wherein the third refractive index is larger than the first refractive index.

50. A method of processing a workpiece, the method comprising:

providing a laser and an optical fiber having multiple interior regions, in-coupling of a laser emission into each of the interior regions causing the fiber to produce an output having a different spatial output profile;

in a temporal pattern, steering the laser emission to a plurality of the interior regions of the fiber such that the output has different spatial output profiles; and while directing the output onto the workpiece to process the workpiece, causing relative movement therebetween, wherein the temporal pattern has a frequency sufficient such that the workpiece is processed, during the relative movement between the workpiece and the output, by an effective output shape combining the different spatial output profiles, and wherein the optical fiber comprises (i) a central core having a first refractive index, (ii) surrounding the central core, a first cladding having a second refractive index, (iii) surrounding the first cladding, an annular core having a third refractive index, and (iv) surrounding the annular core, a second cladding having a fourth refractive index, wherein (i) the first refractive index is larger than the fourth refractive index, (ii) the third refractive index is larger than the fourth refractive index and larger than the first refractive index, and (iii) the second refractive index is smaller than the first refractive index and larger than the fourth refractive index.

51. The method of claim 50, wherein the laser emission is steered in response to a control waveform.

52. The method of claim 51, wherein the control waveform is a square wave.

53. The method of claim 50, wherein the laser emission is a multi-wavelength beam.

54. The method of claim 50, wherein the laser emission is steered to the plurality of the interior regions of the fiber based on at least one of (i) a type of processing performed on the workpiece, (ii) a property of the workpiece, or (iii) a processing path along which the workpiece is processed.

55. The method of claim 54, wherein the laser emission is steered to the plurality of the interior regions of the fiber based on at least the type of processing, and the type of processing is selected from the list consisting of cutting, welding, etching, annealing, drilling, soldering, and brazing.

56. The method of claim 54, wherein the laser emission is steered to the plurality of the interior regions of the fiber based on at least the property of the workpiece, and the property of the workpiece comprises at least one of a thickness of the workpiece, a composition of the workpiece, a reflectivity of the workpiece, or a topography of the workpiece.

57. The method of claim 54, wherein the laser emission is steered to the plurality of the interior regions of the fiber based on one or more directional changes in the processing path.

* * * * *